United States Patent
Cotler et al.

(10) Patent No.: US 10,562,051 B2
(45) Date of Patent: Feb. 18, 2020

(54) POWDER HOPPER FOR DIFFICULT-TO-FLOW POWDERS FOR USE IN THERMAL SPRAYING AND METHOD MAKING AND USING THE SAME

(71) Applicant: OERLIKON METCO (US) INC., Westbury, NY (US)

(72) Inventors: Elliot M. Cotler, Brooklyn, NY (US); Robert F. Savill, Jr., Levittown, NY (US); Ronald J. Molz, Ossining, NY (US); Daniel R. Arjona, Elmont, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

(21) Appl. No.: 15/772,367

(22) PCT Filed: Dec. 9, 2015

(86) PCT No.: PCT/US2015/064767
§ 371 (c)(1),
(2) Date: Apr. 30, 2018

(87) PCT Pub. No.: WO2017/099761
PCT Pub. Date: Jun. 15, 2017

(65) Prior Publication Data
US 2018/0281002 A1    Oct. 4, 2018

(51) Int. Cl.
*B05B 7/14*    (2006.01)
*B65D 88/66*   (2006.01)
*B65G 65/44*   (2006.01)

(52) U.S. Cl.
CPC ............ *B05B 7/1445* (2013.01); *B65D 88/66* (2013.01); *B65G 65/44* (2013.01)

(58) Field of Classification Search
CPC ...... B05B 7/1445; B65D 88/66; B65D 88/70; B65D 88/703; B65G 65/44
(Continued)

(56) References Cited

U.S. PATENT DOCUMENTS 2,044,326 A * 6/1936 Pickell ..................... C02F 1/687
                                                        222/185.1
2,254,448 A * 9/1941 Pursel ........................ B06B 3/00
                                                        222/196

(Continued)

FOREIGN PATENT DOCUMENTS

DE    3029501    2/1982
DE    8904538    8/1990
(Continued)

OTHER PUBLICATIONS

Article by T.V. Nguyen entitled *Funnel Flow in Hoppers*, Journal of Applied Mechanics, Dec. 1980, vol. 47, pp. 729-735.
(Continued)

*Primary Examiner* — Patrick M. Buechner
*Assistant Examiner* — Michael J. Melaragno
(74) *Attorney, Agent, or Firm* — Greenblum & Bernstein, P.L.C.

(57) ABSTRACT

A hopper assembly includes a hopper configured to contain a feedstock material. A vibration imparting device is arranged inside the hopper and a vibration source coupled to the vibration imparting device. Embodiments of the instant invention are believed to provide various improvements in feeding uniformity by providing various hopper configurations that ensure a more consistently uniform filling of the metering device for a variety of difficult-to-feed materials and not-so-difficult-to-feed materials. One, more or all of these embodiments are also believed to improve accuracy and add precision to control, and, in addition, offer more (Continued)

simplified hopper construction—which is less costly to manufacture and maintain.

24 Claims, 31 Drawing Sheets

(58) Field of Classification Search
USPC .......................................................... 222/196
See application file for complete search history.

(56) References Cited

U.S. PATENT DOCUMENTS

| | | | | |
|---|---|---|---|---|
| 2,450,155 | A * | 9/1948 | Packwood, Jr. | A47K 5/10 222/181.2 |
| 2,526,735 | A * | 10/1950 | Duce | B05B 7/1404 200/820 |
| 2,727,656 | A * | 12/1955 | Packwood, Jr. | A47K 5/10 222/196 |
| 3,166,222 | A * | 1/1965 | Schrader | B65D 88/66 222/195 |
| 3,261,514 | A | 7/1966 | Haley | |
| 3,339,808 | A * | 9/1967 | Sterns | B65D 90/626 222/196 |
| D214,130 | S | 5/1969 | Appel | |
| 3,501,062 | A * | 3/1970 | Catalano | B05B 7/1445 222/161 |
| 3,715,059 | A | 2/1973 | Hyer | |
| 3,716,021 | A | 2/1973 | Fry | |
| 3,933,281 | A * | 1/1976 | Uralli | B65D 88/66 222/200 |
| 3,976,332 | A | 8/1976 | Fabel | |
| 4,013,321 | A | 3/1977 | Pendleton | |
| 4,025,122 | A | 5/1977 | Diemert | |
| 4,067,150 | A * | 1/1978 | Merrigan | B24O 5/04 222/196 |
| D249,967 | S | 10/1978 | Bernes | |
| 4,129,233 | A | 12/1978 | Schmader | |
| 4,172,535 | A | 10/1979 | Smith | |
| D270,416 | S | 9/1983 | Thrush | |
| 4,561,808 | A | 12/1985 | Spaulding | |
| 4,582,254 | A | 4/1986 | Rotolico | |
| 4,729,772 | A | 3/1988 | Asanuma | |
| 4,776,493 | A * | 10/1988 | Tegel | B65D 90/626 222/196 |
| 4,863,076 | A | 9/1989 | Anderson | |
| 4,900,199 | A | 2/1990 | Spaulding | |
| 4,974,494 | A * | 12/1990 | Kroger | B25D 9/14 173/17 |
| 5,472,117 | A * | 12/1995 | Geiser | B65D 88/66 222/1 |
| D376,954 | S | 12/1996 | Burns | |
| 5,718,581 | A * | 2/1998 | Fernwood | A61O 3/025 222/196 |
| 5,824,210 | A | 10/1998 | Kuryluk | |
| D403,555 | S | 1/1999 | Burns | |
| D407,949 | S | 4/1999 | Henry | |
| 5,947,169 | A * | 9/1999 | Wegman | B65B 39/003 141/129 |
| D460,019 | S | 7/2002 | Thimm | |
| 6,561,446 | B2 | 5/2003 | Okabe | |
| 6,568,613 | B1 | 5/2003 | Gloor | |
| 6,648,163 | B2 | 11/2003 | Porter | |
| D491,696 | S | 6/2004 | Cole | |
| D493,664 | S | 8/2004 | Siegel | |
| D594,285 | S | 6/2009 | Merey | |
| 7,607,490 | B2 * | 10/2009 | Reis | B65D 88/66 173/17 |
| D605,502 | S | 12/2009 | Honda | |
| 7,665,633 | B2 * | 2/2010 | MacMichael | B65B 1/08 222/161 |
| D620,556 | S | 7/2010 | Hillhouse | |
| D628,883 | S | 12/2010 | Stephens | |
| D636,946 | S | 4/2011 | Able | |
| D648,492 | S | 11/2011 | Able | |
| D674,689 | S | 1/2013 | Chen | |
| D685,631 | S | 7/2013 | Rapparini | |
| D704,902 | S | 5/2014 | Wu | |
| D721,860 | S | 1/2015 | Parks | |
| D726,006 | S | 4/2015 | Rapparini | |
| D728,865 | S | 5/2015 | Tsengas | |
| D741,024 | S | 10/2015 | Liu | |
| 9,278,767 | B2 * | 3/2016 | Meckstroth | B65B 1/08 |
| 9,505,566 | B2 * | 11/2016 | Harvey | B65G 53/22 |
| 2005/0040185 | A1 * | 2/2005 | MacMichael | B65B 1/08 222/196 |
| 2006/0011141 | A1 | 1/2006 | Bird | |
| 2009/0255475 | A1 | 10/2009 | Black | |
| 2010/0077963 | A1 | 4/2010 | Lipscomb | |
| 2011/0204094 | A1 * | 8/2011 | Meckstroth | B65B 1/08 141/12 |
| 2014/0116837 | A1 | 5/2014 | Marchesini | |
| 2014/0202582 | A1 * | 7/2014 | Meckstroth | B65B 1/08 141/2 |
| 2014/0251212 | A1 | 9/2014 | Tokyo | |
| 2014/0326755 | A1 | 11/2014 | Swan | |
| 2016/0144985 | A1 * | 5/2016 | Meckstroth | B65B 1/08 141/102 |

FOREIGN PATENT DOCUMENTS

| | | |
|---|---|---|
| JP | 40-857 | 1/1965 |
| JP | 42-23804 | 10/1967 |
| JP | 56-35905 | 8/1981 |
| JP | 2000-198539 | 7/2000 |
| JP | 2002-053229 | 2/2002 |
| JP | 2005-040681 | 2/2005 |
| WO | WO 00/17070 | 3/2000 |

OTHER PUBLICATIONS

PCT Search Report in PCT/US2015/064767.
EPO Search Report in 15910382.9.
JP Office Action dated Oct. 3, 2019 and issued in JP application No. 2018-527077.

* cited by examiner

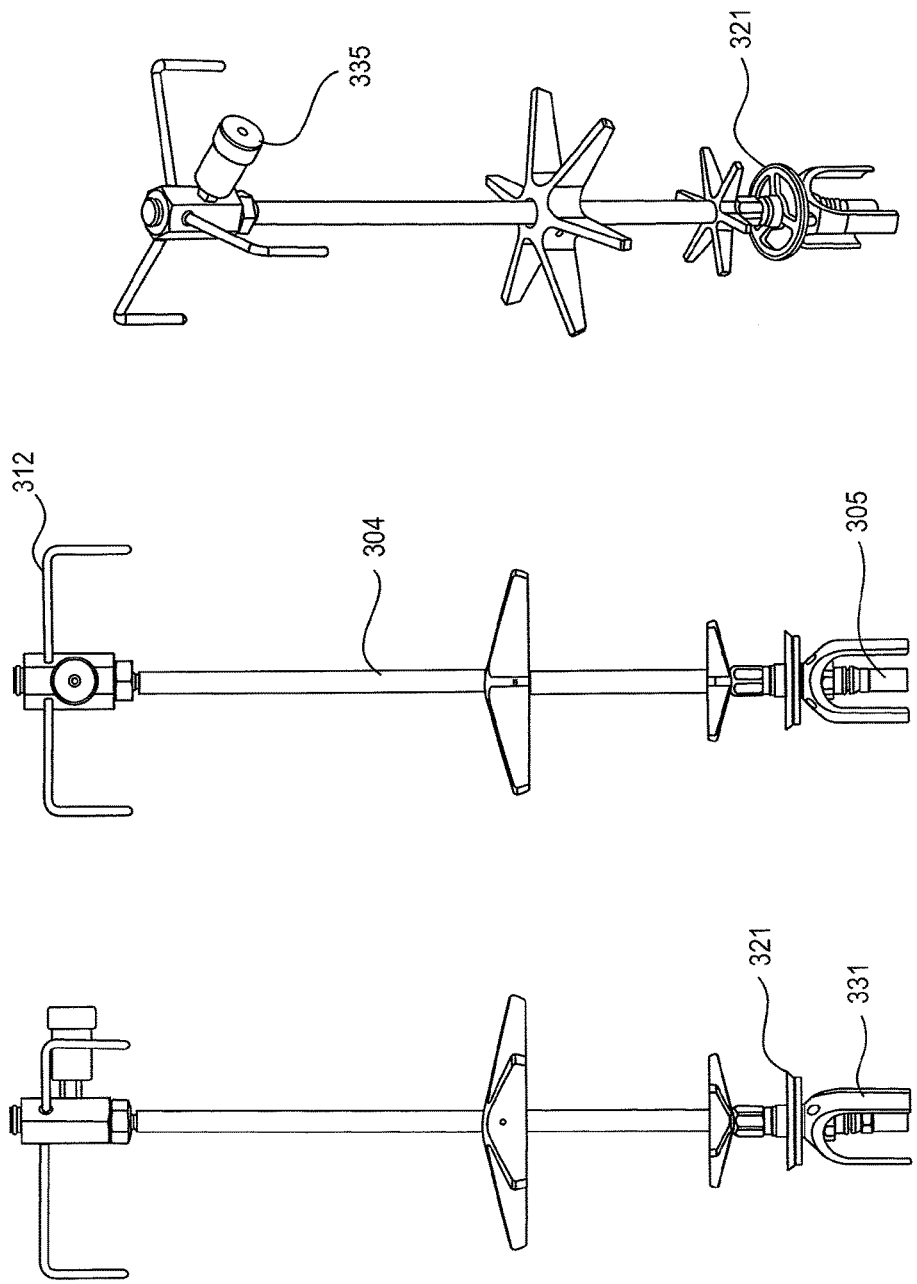

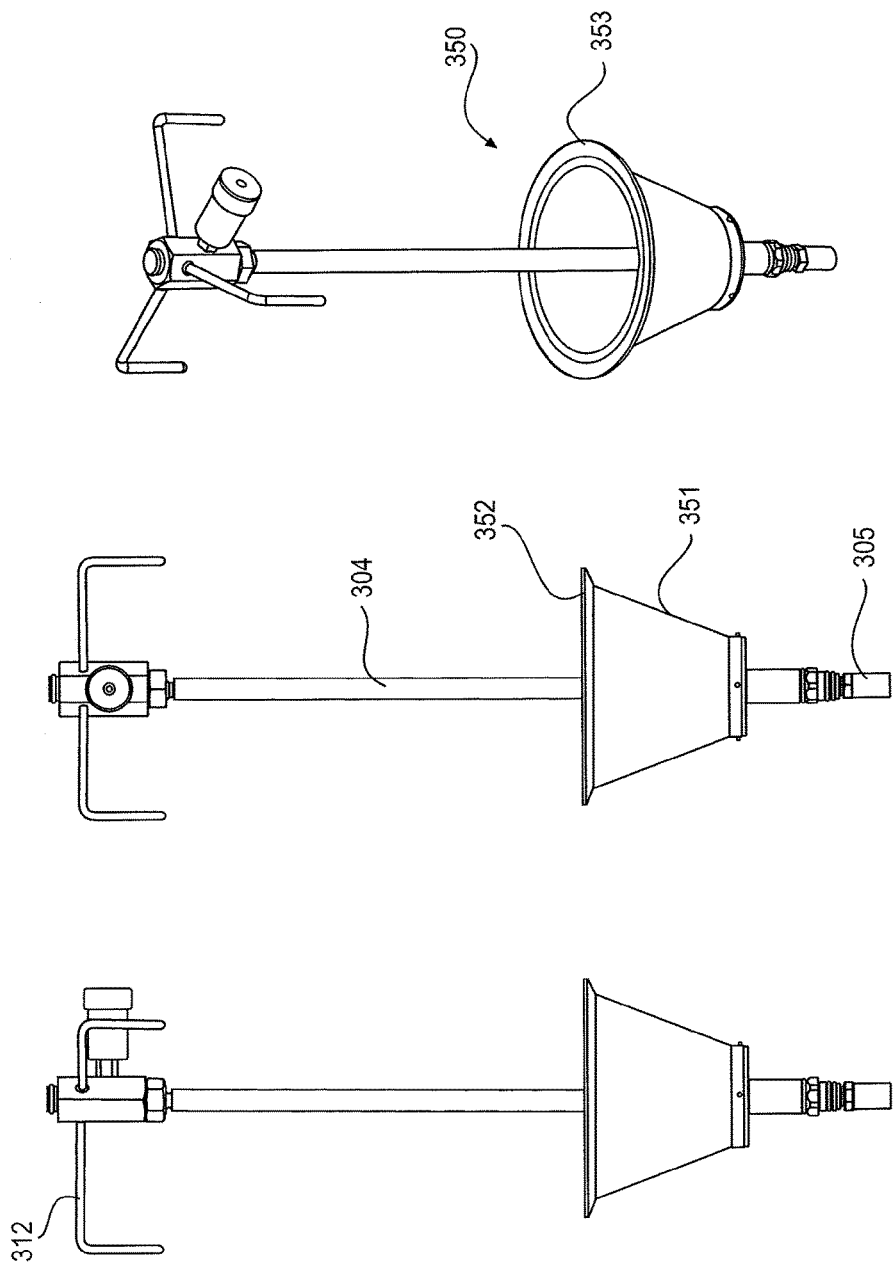

POWDER HOPPER FOR DIFFICULT-TO-FLOW POWDERS FOR USE IN THERMAL SPRAYING AND METHOD MAKING AND USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

Two major distinctive types of powder feeder currently dominate a market of equipment for thermo or thermal spray operations. One is a rotary disk feeder and the other a so-called "lost weight feeder."

Rotary disk feeders are considered as almost volumetric type of powder feeding devices. Their performance, however, is highly dependent on the quality of powder filling a metering groove. Depending on particle shape and size of the powders, some feedstock materials exhibit high propensity to bridging and ratholing during groove fill-up. A relevant description of the phenomenon of ratholing is described in Article by T.V. Nguyen entitled *Funnel Flow* in Hoppers, Journal of Applied Mechanics, December 1980, Vol. 47, pages 729-745, the disclosure of which is herein incorporated by reference. In contrast, other feedstock materials flow more freely and fast. A multitude of groove geometries and corresponding spreader and pick-up shoes has been developed to provide proper performance for a variety of difficult-to-feed materials.

In addition, hoppers with mechanically driven built-in stirrers have been employed to insure that difficult-to-feed powder fills metering groove without large voids or overcompression. However, these types of hoppers are often geometrically complicated and expensive to construct. Still further, they typically require time consuming maintenance, especially during switching from one feedstock powder to another.

Known hoppers also have difficulty regarding how to prevent oversized specks of material (agglomerated or contaminated powder feedstock during improper handling) from entering the feedstock line.

In contrast, a "lost weight feeder" is a fluidized type of feeder that may employ an externally mounted vibrator which is used to maintain the powder in a loose free-flowing state and permeable to the passage of a fluidizing gas. The vibrator shakes the whole hopper that is flexibly mounted on a weight sensor. An output signal from the weight sensor is constantly analyzed and the rate of change is then computed by control circuitry. This device can also utilize a visual display. However, this arrangement has deficiencies; time delay is significant and is a hostage to a desired accuracy. A decrease in the vibrational component of a total force acting on the weight sensor allows to reduce time delay and improves accuracy of computed rate of weight change.

What is desired is an improvement in feeder uniformity by providing a consistently uniform filling of the metering device for a variety of difficult-to-feed materials. It would also be beneficial to improve accuracy and precision of controls, as well as to simplify hopper construction—which would be less costly to manufacture and maintain. An additional improvement would provide more effective protection against oversized specks or foreign objects entering the feedstock line. Yet another benefit would be to reduce the time required to perform hopper disassembly, clean-up and reassembly typically required between changes of feedstock material.

SUMMARY OF THE INVENTION

Embodiments of the instant invention are believed to provide various improvements in feeding uniformity by providing various hopper configurations that ensure a more consistently uniform filling of the metering device for a variety of difficult-to-feed materials and not-so-difficult-to-feed materials. One, more or all of these embodiments are also believed to improve accuracy and add precision to control, and, in addition, offer more simplified hopper construction—which is less costly to manufacture and maintain. In addition, the disclosed embodiments provide more effective protection against oversized specks or foreign objects entering feedstock line and deleteriously affecting the material feed as compared to conventional hopper configurations. These embodiments also reduce the time required to perform hopper disassembly, clean-up and reassembly typically required between changes of feedstock material.

In accordance with a non-limiting embodiment of the invention, there is provided a hopper assembly comprising a hopper configured to contain a feedstock material, a vibration imparting device arranged inside the hopper, and a vibration source coupled to the vibration imparting device.

In embodiments, the feedstock material is a thermal spray powder.

In embodiments, the hopper assembly is coupled to a feeder device.

In embodiments, the feeder device is a rotary disk feeder.

In embodiments, the feeder device is a lost weight feeder.

In embodiments, the hopper assembly is coupled to a feeder device via an adaptor.

In embodiments, a bottom tapered discharge end of the hopper assembly is coupled to a feeder device via an adaptor.

In embodiments, the vibration source is a pneumatic actuator.

In embodiments, the vibration source is an electric actuator.

In embodiments, the vibration source is an actuator generating vibrations in a range of approximately 2000 (2K) to 20,000 (20K) vibrations per minute.

In embodiments, the vibration source is arranged in an area of a hopper discharge opening.

In embodiments, the vibration imparting device is arranged in an area of a hopper discharge opening.

In embodiments, the vibration imparting device is a conically-shaped sleeve.

In embodiments, the vibration imparting device is a feedstock screen sleeve.

In embodiments, the vibration source is axially and/or radially aligned with a center axis of the hopper.

In embodiments, the vibration source is arranged inside the hopper.

In embodiments, the vibration source is arranged outside the hopper.

In embodiments, the vibration imparting device comprises plural rods oriented generally parallel to a center axis of the hopper and coupled to a vibrating support.

In embodiments, the vibration imparting device comprises plural generally equally spaced rods oriented generally downwards and having upper ends coupled to a shaft via a support ring.

In embodiments, the vibration imparting device comprises a member having radially oriented spokes.

In embodiments, the vibration imparting device is mounted in an adaptor configured to couple the hopper to a feeder device.

In accordance with a non-limiting embodiment of the invention, there is provided a hopper assembly for powder feedstock, comprising a hopper configured to contain a feedstock material and having a bottom discharge section, a vibration imparting device arranged inside the hopper, an adapter configured to couple the bottom discharge end of the hopper to a feeder device, and a vibration source coupled to or removable with one of the adaptor and a hopper cover.

In accordance with a non-limiting embodiment of the invention, there is provided a hopper assembly for thermal spray powder feedstock, wherein the hopper assembly comprises a hopper configured to contain a feedstock material and having a tapered bottom section, a vibration imparting device arranged inside the hopper, an adapter configured to couple a discharge end of the hopper to a feeder device, and a vibration source. The vibration source is coupled to or removable with the adaptor and/or the vibration imparting device is coupled to or removable with the adaptor.

In embodiments, there is provided a method of feeding powder feedstock material to a feeder device via the hopper assembly of any of the types described above, wherein the method comprises actuating the vibration source to cause the vibrating imparting device to vibrate and impart vibration to the powder feedstock material disposed inside the hopper.

In embodiments, the herein disclosed hopper can be used in both rotary disk and "lost weight" fluidic feeders. This can be especially advantageous when the hopper bottom has an internal collar driven by a vibrational actuator. The collar is mounted in the proximity of the hopper discharge throat adjacent to a metering device. The collar resembles a funnel opened towards the hopper interior. This funnel-shaped structure may contain a safety screen to protect the metering device from oversized foreign objects. Flexible isolating rings or annular diaphragm can be utilized to allow collar oscillating mainly along a main hopper center axis. A skeleton or tree-like structure can advantageously be utilized which can be quickly mounted onto and off of a vibrational actuator located within an internal hopper space to spread vibrations through powder. The collar and combined structure may be driven by or have a built-in source of vibration applied by electrical, pneumatic, mechanical linkage, or other known power sources. This can occur even through the hopper wall. In operation, the hopper can remain mainly stationary while collar vibration is utilized to transfer vibration to the feedstock material contained within hopper. The feedstock is caused to loosen-up by effect of vibro-fluidization and can fill the metering device in a consistent manner without bridging or ratholing. When used with a "lost weight feeder", the use of an internally oscillating structure can drastically reduce external vibrational forces acting on a weight sensor. In this manner, faster and more accurate computed feed rates can result or be determined.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted drawings by way of a non-limiting example embodiment of the present invention, and wherein:

FIG. 11 shows a side view of the spoke-like structure used in the embodiment of FIGS. 8-10;

FIG. 12 shows another side view of the spoke-like structure used in the embodiment of FIG. 8;

FIG. 13 shows a side perspective view of the spoke-like structure used in the embodiment of FIG. 8;

FIG. 14 shows a side view of an alternative to spoke-like structure that can be used in the embodiment of FIG. 8. This structure can also be used in an embodiment similar to that of FIG. 20 described below;

FIG. 15 shows another side view of the alternative to spoke-like structure of FIG. 14;

FIG. 16 shows a side perspective view of the alternative to spoke-like structure of FIG. 14;

Figure 20:
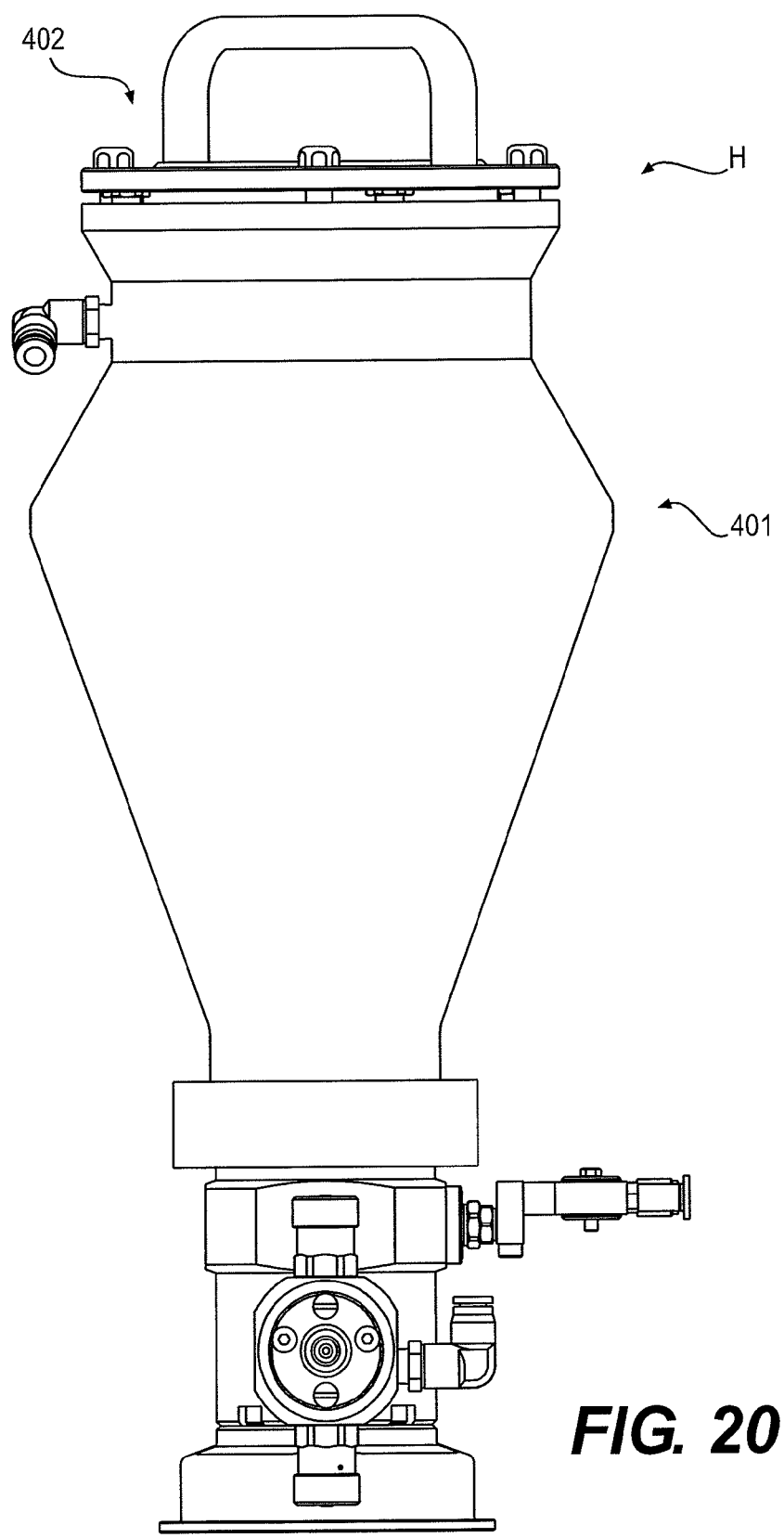
FIG. 20 shows a side view of a fifth non-limiting embodiment of a hopper assembly in accordance with the invention.
Figure 21:
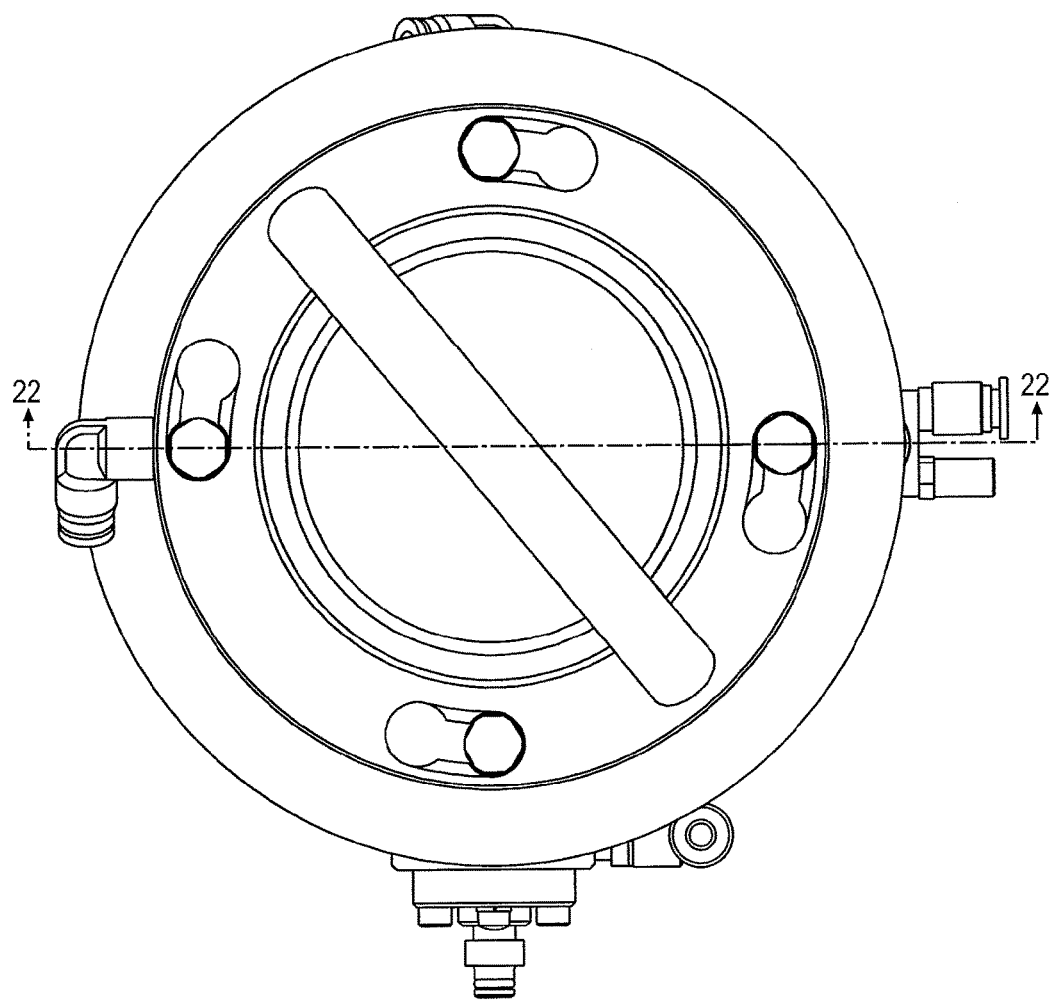
Figure 22:
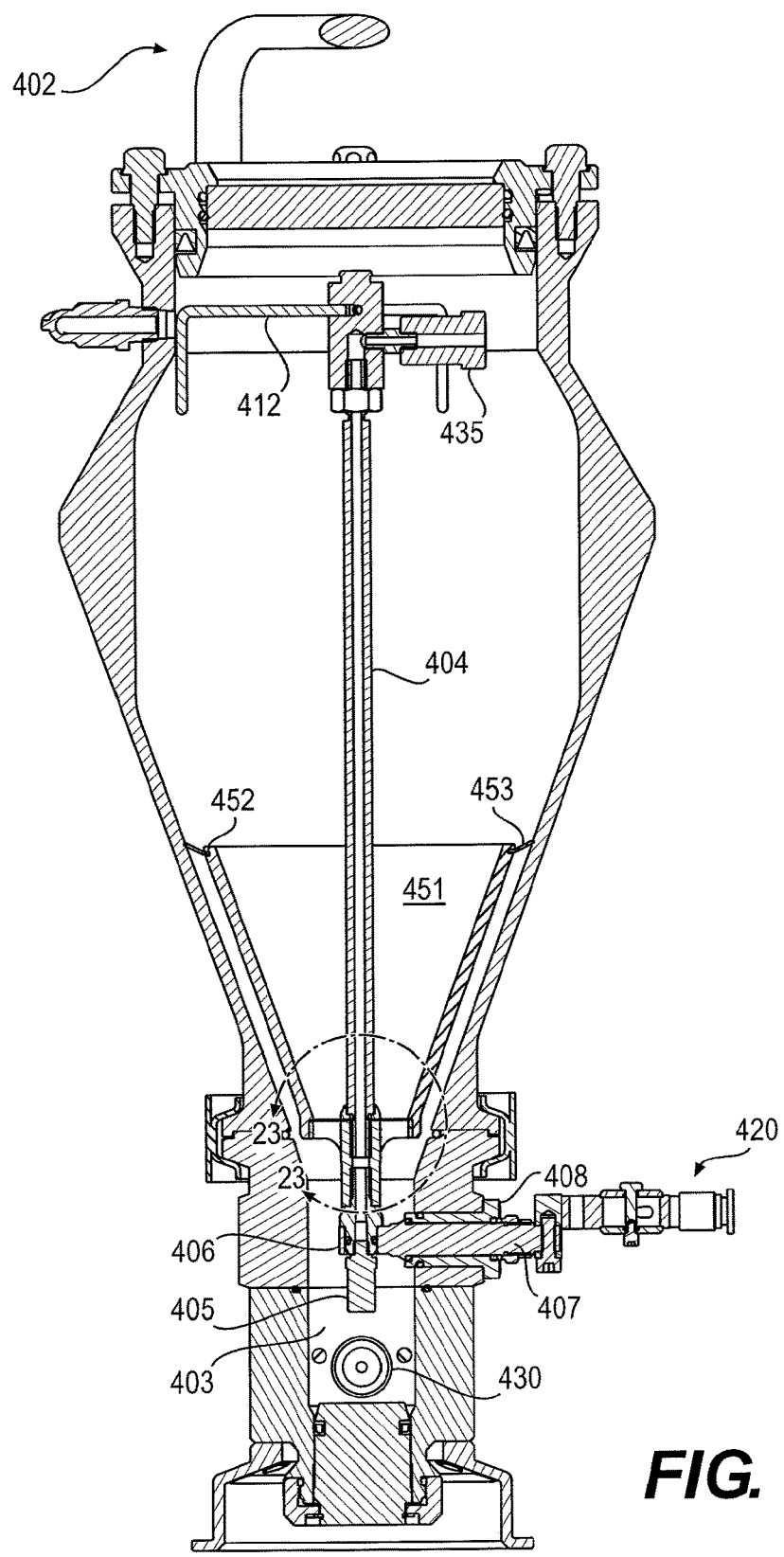
Figure 23:
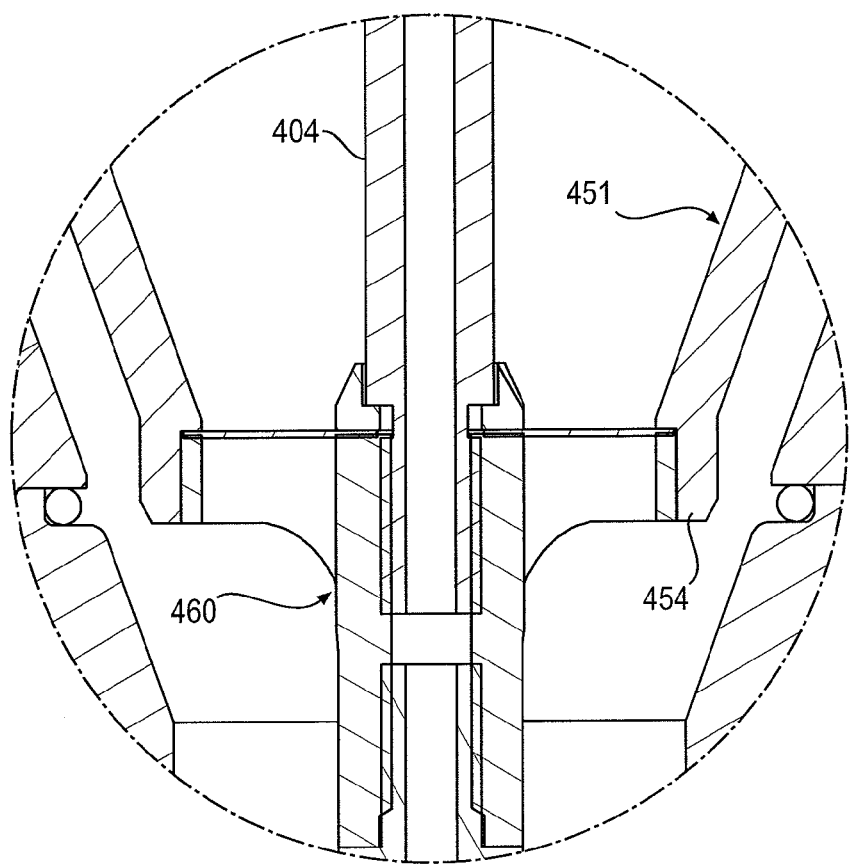
Figure 24:
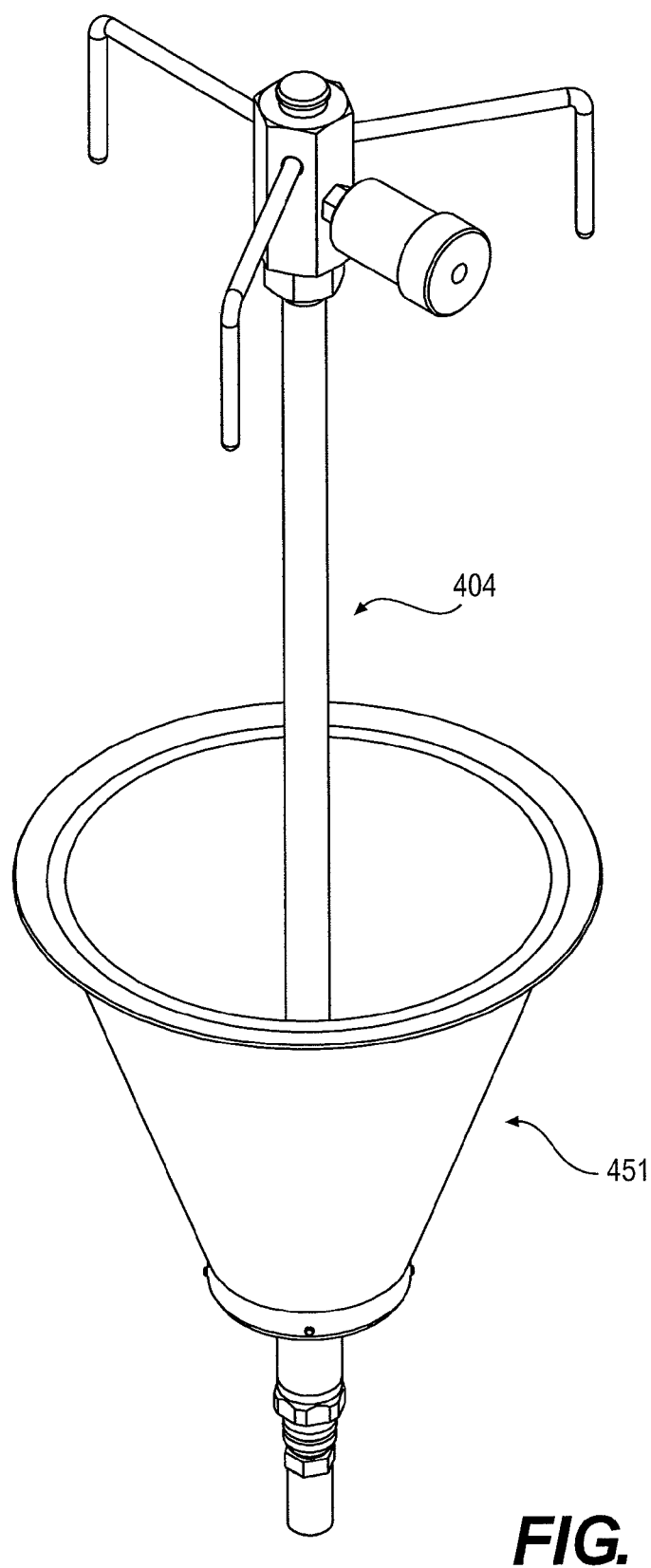
Figure 25:
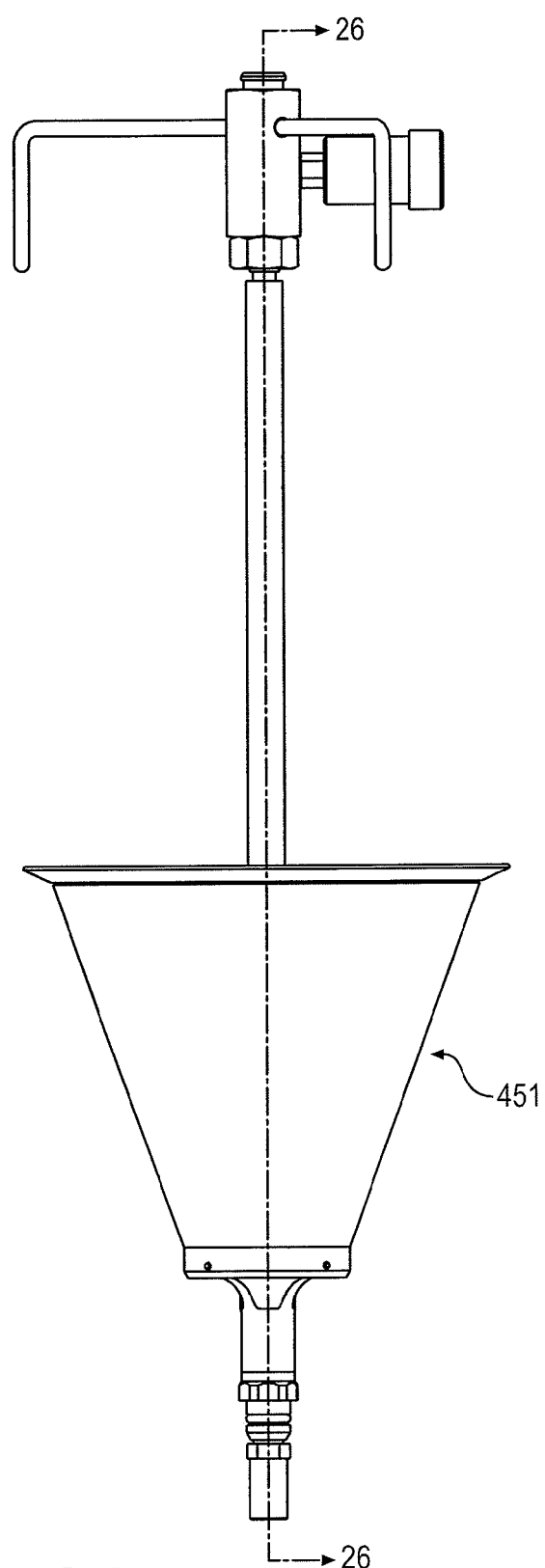
Figure 26:
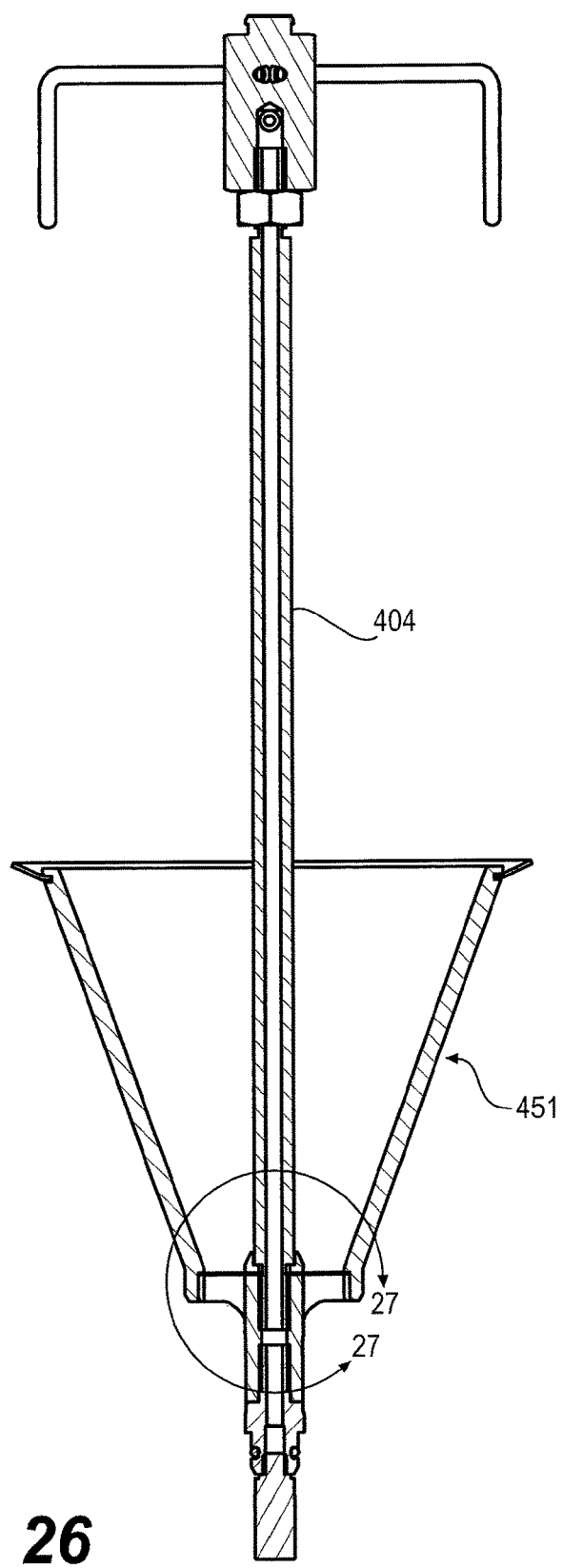
Figure 27:
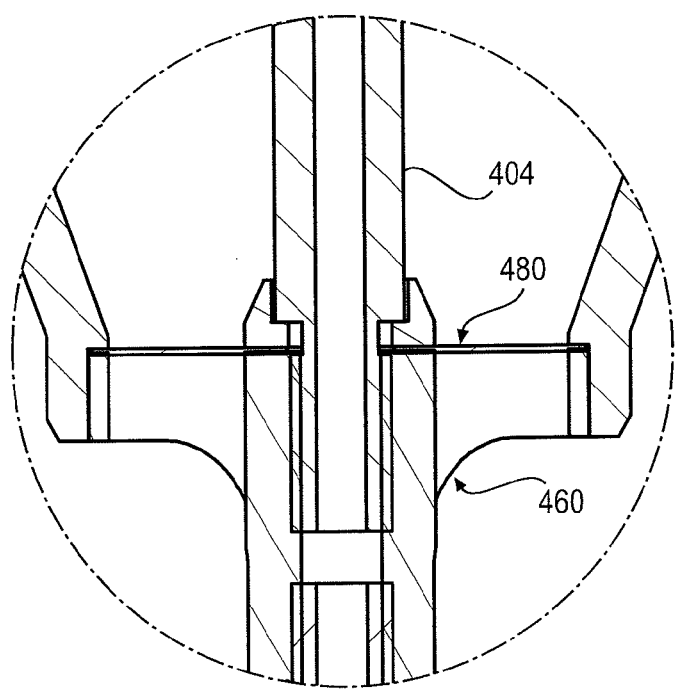
Figure 28:
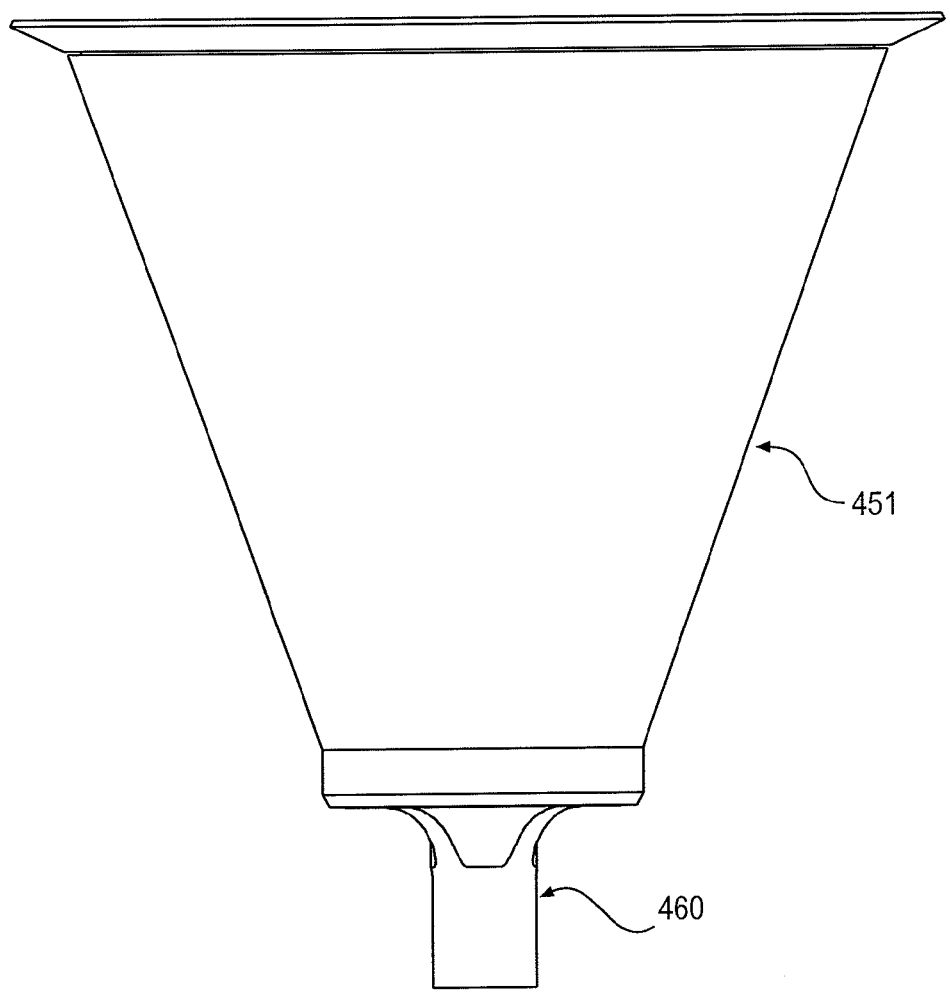
Figure 29:
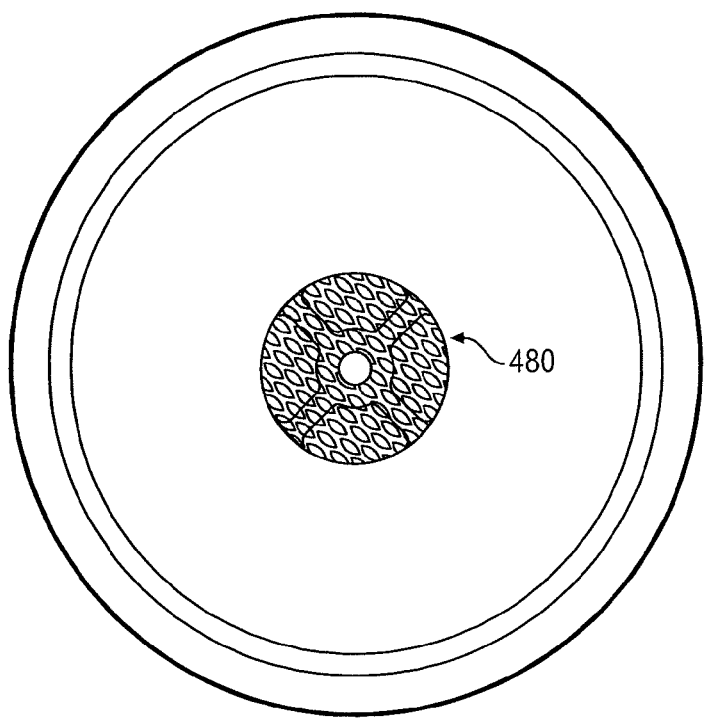
Figure 30:
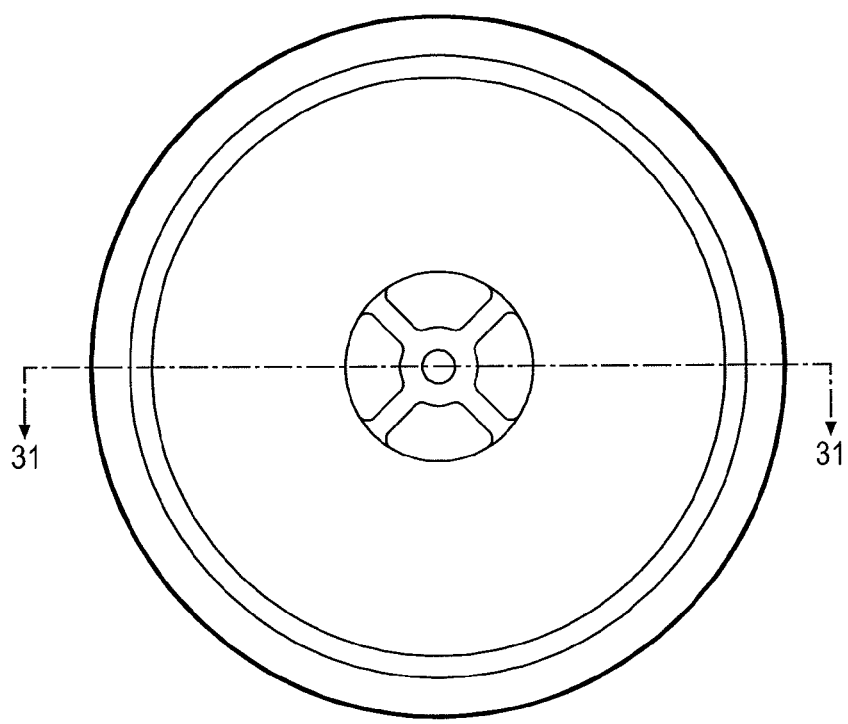
Figure 31:
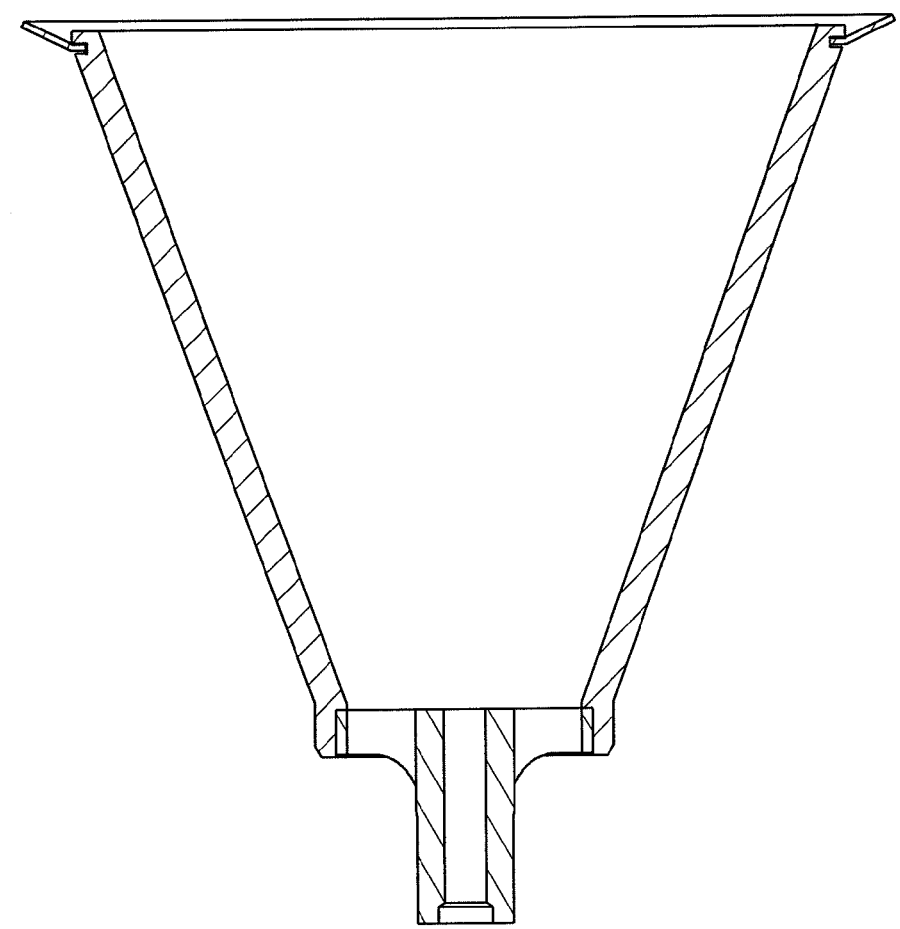
Figure 32:
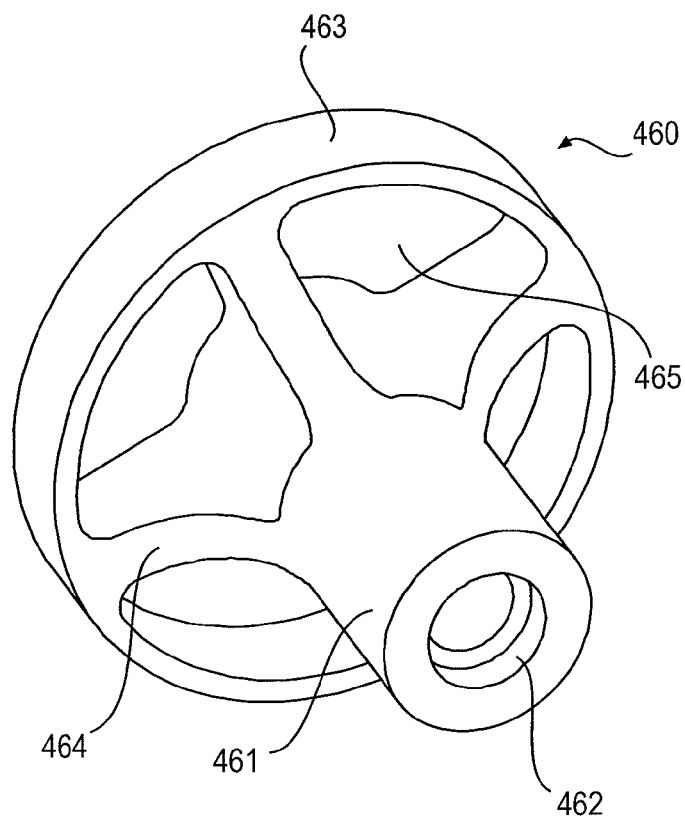
Figure 33:
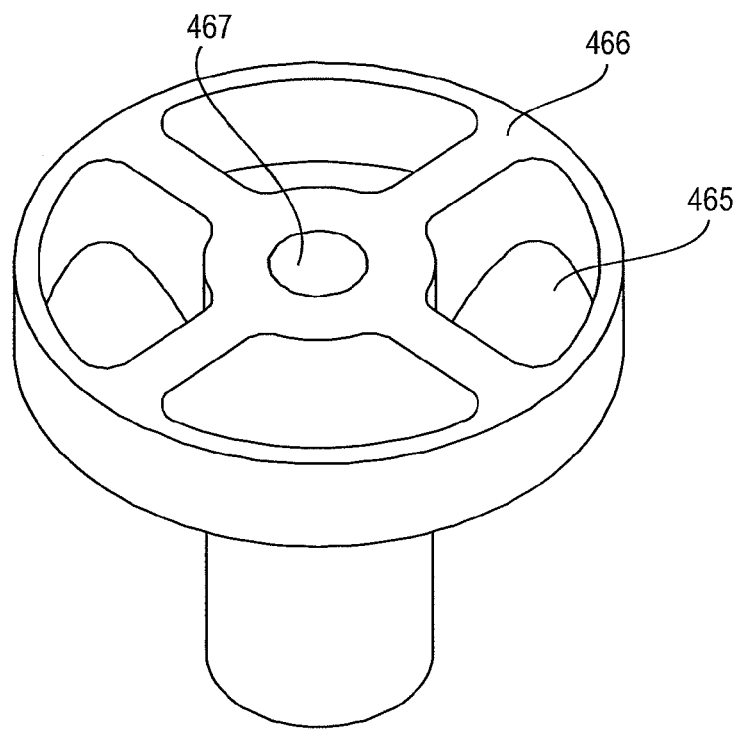
Figure 34:
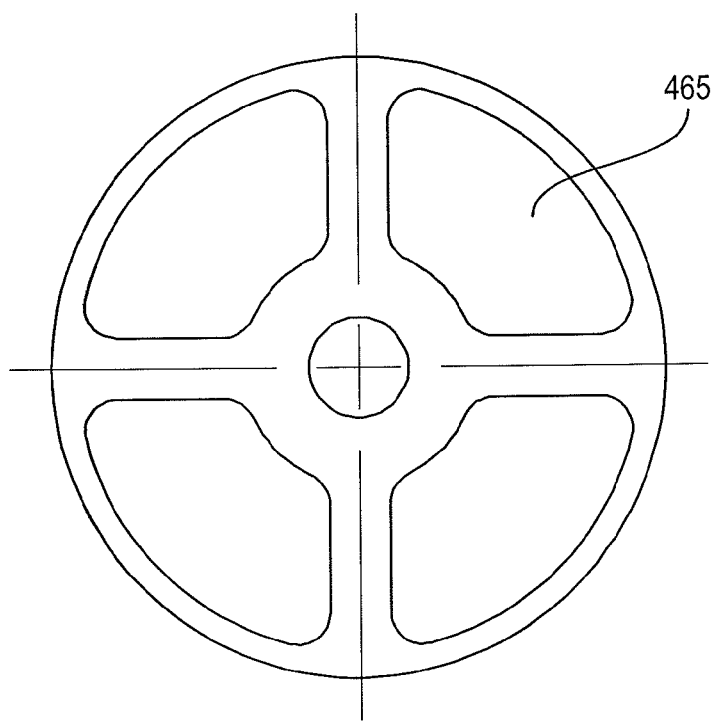
Figure 35:
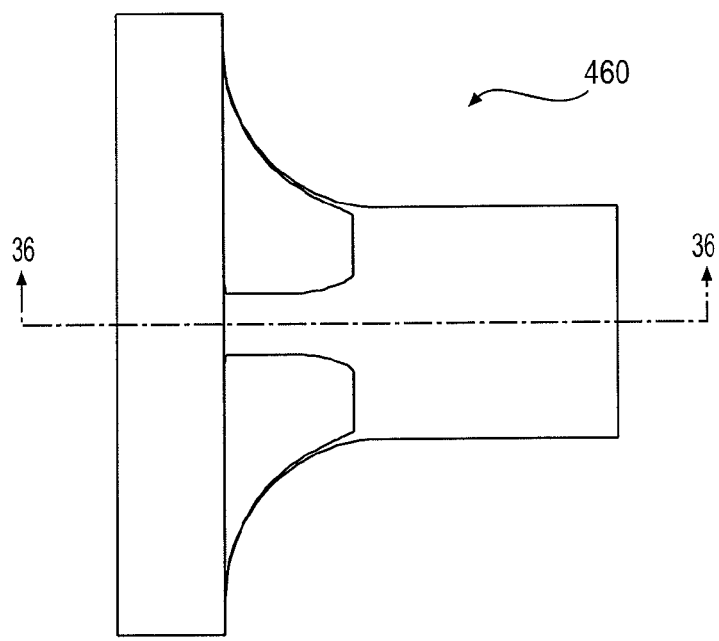

In this embodiment, a vibrating funnel section is used in combination with a vibrating actuator to propagate vibrations into bulk powder;

FIG. 21 shows a top view of the hopper assembly of FIG. 20;

FIG. 22 shows a side cross-section view of the hopper assembly of FIG. 20;

FIG. 23 shows an enlarged portion of FIG. 22;

FIG. 24 shows a side view of a vibrating structure having a funnel section assembly as used in the embodiment of FIG. 20;

FIG. 25 shows a side view of the vibrating structure of FIG. 24;

FIG. 26 shows a side cross-section view of the vibrating structure of FIG. 25;

FIG. 27 shows an enlarged portion of FIG. 26;

FIG. 28 shows a side view of the funnel section assembly utilizes in the vibrating structure shown in FIG. 24;

FIG. 29 shows a top view of the funnel section assembly of FIG. 28;

FIG. 30 shows a top view of an alternative funnel section assembly. This embodiment is similar to that of FIGS. 28 and 29 except that no screen is utilized;

FIG. 31 shows a cross-section view of the funnel section assembly of FIG. 30;

FIG. 32 shows a bottom side perspective view of a connector used in the funnel section assembly shown in FIGS. 22-31;

FIG. 33 shows a top side perspective view of the connector of FIG. 32;

FIG. 34 shows a top view of the connector of FIG. 32;

FIG. 35 shows a side view of the connector of FIG. 32; and

Figure 36:
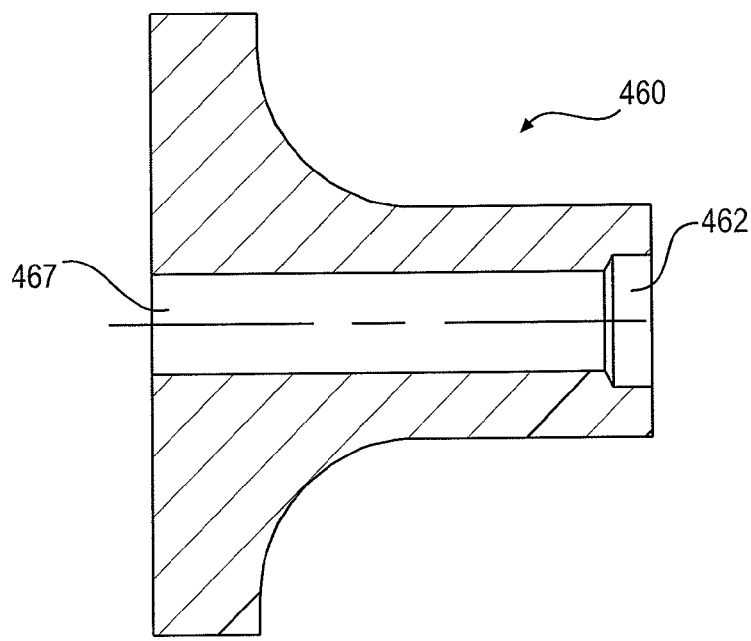

FIG. 36 shows a side cross-section view of the connector of FIG. 35.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
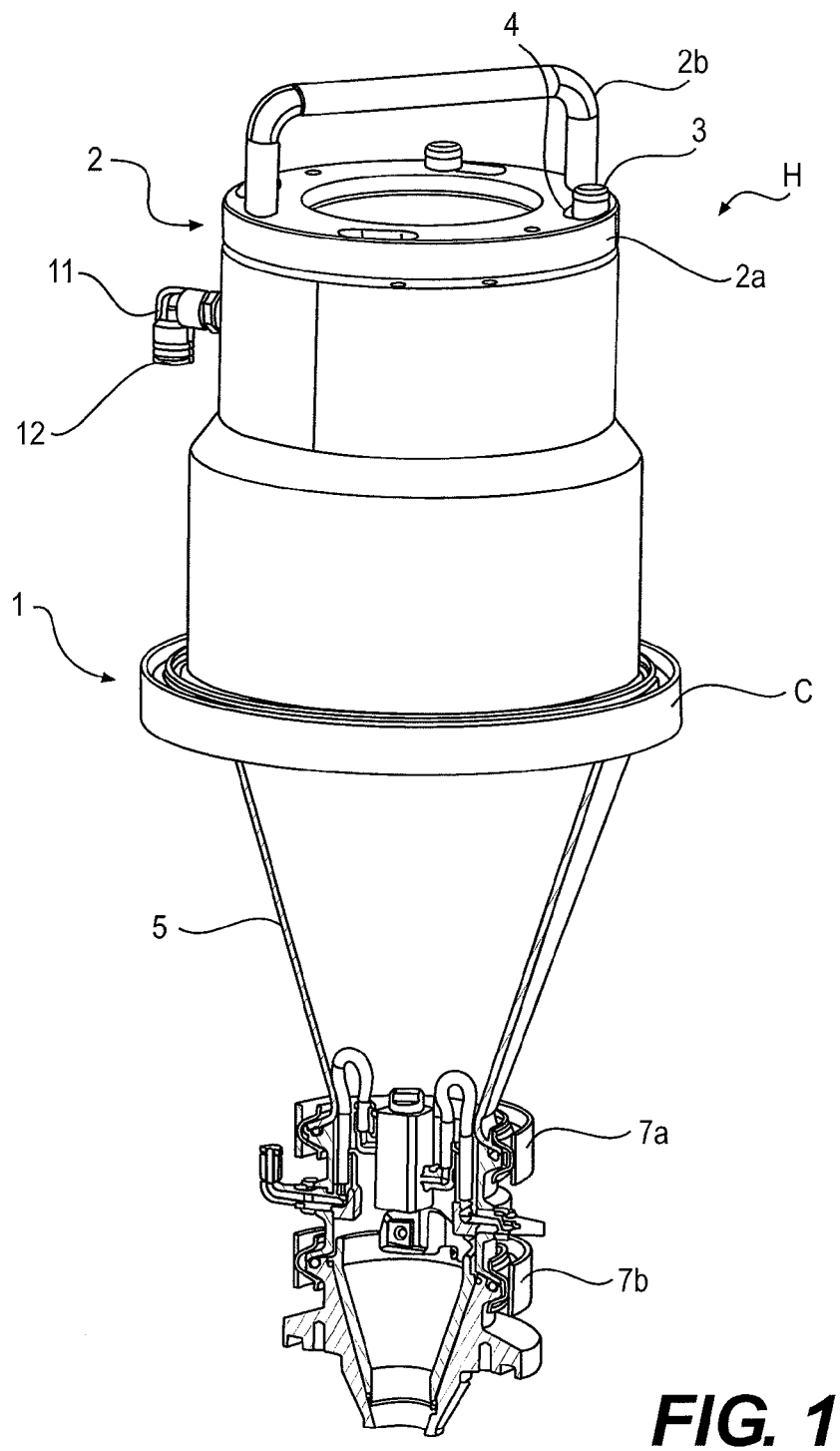
FIG. 1 is a first non-limiting embodiment of a hopper assembly in accordance with the invention. In this embodiment, the bottom section is shown in cross-section and is configured for installation onto a rotary disk feeder.
Figure 2:
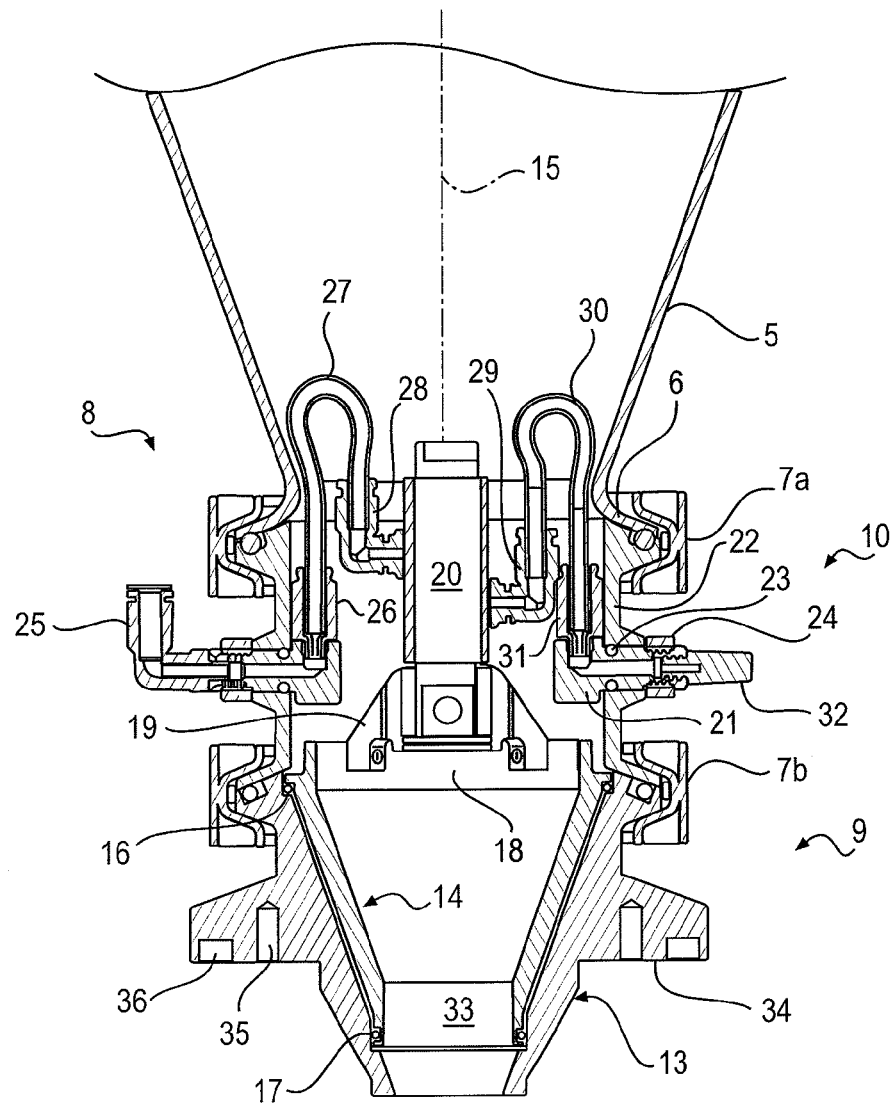
FIG. 2 shows an enlarged view of the bottom section shown in FIG. 1.

Referring now to the first embodiment shown in FIGS. 1 and 2, there is shown a hopper assembly H which utilizes a hopper 1 and a hermetically sealed cover 2 removably mounted to the hopper 1. The cover 2 includes a base 2a and a handle 2b and can be releasably locked to the hopper 1 via a connection arrangement. In the exemplary embodiment, the connection arrangement utilizes locking fingers or projections 3 mounted to the upper end of the hopper 1 and slots 4 arranged on the base 2a. With such an arrangement, the cover 2 can be lowered axially and then twisted or partially rotated into locking position.

In the embodiment of FIG. 1, the hopper 1 includes an upper end to which the cover 2 is secured and a tapered lower section 5 coupled via a main clamp C. However, the portion between the upper end and the lower section 5 can also be a single body hopper within the scope of the invention.

Referring to FIG. 2, it can be seen that the lower section or part 5 of the hopper 1 is tapered and includes a lower lip or flange 6 that allows the hopper 1 to be hermetically sealed, via e.g., a clamp 7a, to an upper flanged end of a receptacle unit 8. The unit 8 includes two main components—upper and lower. A lower component is an adapter module 9 and an upper component is a transferring module 10. Modules 9 and 10 are connected at their respective flanged ends to one another by a second clamp 7b. The details of modules 9 and 10 will be described in more detail below.

Referring back to FIG. 1, it can be discerned that the upper portion of hopper 1 includes a built-in port 11 that is connected to a source 12 of fluidizing gas (shown schematically). The source 12 can pressurize the hopper 1 while in a hermetically sealed state to, for example, a pressure of between 10 psi and up to 200 psi.

Referring back to FIG. 2, it can be seen that the adapter module 9 includes two main components, i.e., a stationary body 13 and an insert 14 positioned concentrically therein and arranged concentrically relative to a vertical or center axis 15 of hopper 1. The insert 14 can have the form of a sleeve that is conical or funnel shaped and is positioned within body 13 so as to move relative thereto. This positioning or mounting occurs via a flexible upper O-ring 16 and a flexible bottom O-ring 17. The top portion 18 of the insert 14 is coupled to or mounted to a lower end of a bracket 19. Another portion of the bracket 19 is coupled to one end of a vibrator 20. In this non-limiting embodiment, a pneumatic vibrator is utilized. However, other types of vibrating devices can also be utilized such as hydraulic or electric types. The vibrator 20 is positioned or oriented essentially along hopper vertical axis 15 and extends within the module 10.

The transferring module 10 includes two elbows 21 which are in sealing engagement with and have one end that passes through a wall 22 of the module 10. This sealing engagement is provided by one or more O-rings 23. Each elbow 21 is retained by a corresponding nut 24. A first fitting 25 connects one of the two elbows 21 to a source of compressed air (not shown). The elbow 21 in fluid communication with fitting 25 is coupled to another fitting 26 arranged on one end of a flexible tube 27. The tube 27, in turn, has an opposite end coupled to an intake portion of the vibrator 20 via a fitting 28. An exhaust port of the vibrator 20 is connected by a fitting 29 to another flexible tube or hose 30 whose opposite end is coupled via fitting 31 to another elbow 21. A muffler 32 is connected to an opposite outside portion of the elbow 21 and is positioned outside of the wall 22. When a source of compressed air (not shown) is turned on and compressed air is introduced via port 25, the vibrator 20 is actuated. The vibrations are transferred, via the bracket 19, from the vibrator 20 to the insert 14. When bulk feedstock powder disposed in the hopper 1, the vibrations of the insert 14 are imparted to the powder contained therein. When this happens, the feedstock powder loosens-up and flows in a controllable fashion, e.g., based on a predetermined vibration level, through a bottom throat 33 of insert 14 into a metering device (not shown). To facilitate mounting of the adapter module 9 to such a metering device, a bottom face or flange 34 of body 13 includes mounting holes 35 and an O-ring groove 36. The arrangement of the mounting holes 35, which can be a standard mounting-hole pattern, and the location of the sealing O-ring groove 36 can be, by way of non-limiting example, an arrangement that connects to an existing feeder.

Figure 3:
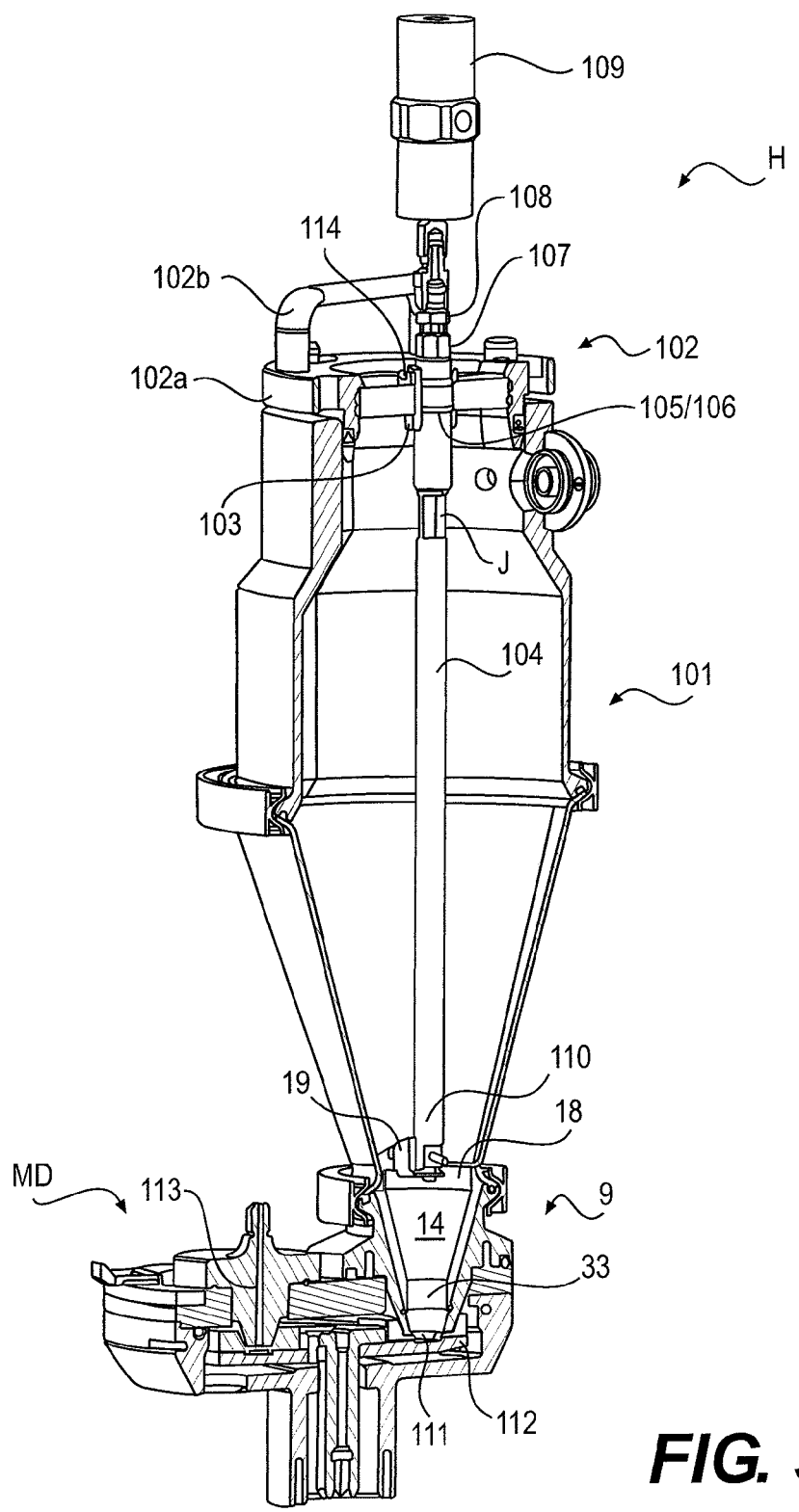
FIG. 3 shows a second non-limiting embodiment of a hopper assembly in accordance with the invention. In this embodiment, the vibration actuator is located outside of the hopper and/or not located inside the hopper, and is connected to a vibrating throat insert via a mechanical linkage passing through a top cover.
Figure 4:
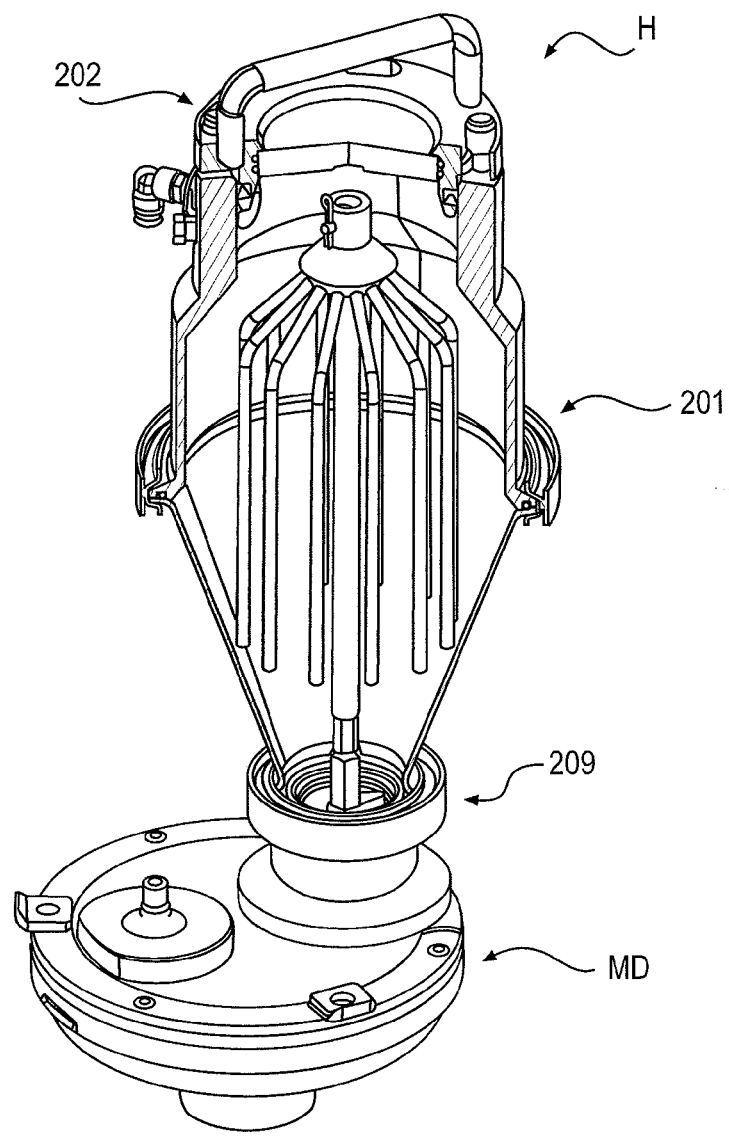
FIG. 4 shows a third non-limiting embodiment of a hopper assembly in accordance with the invention. In this embodiment, an internal vibrational actuator is used in combination with a skeleton or tree-like (in shape) structure that propagates vibrations into bulk powder.
Figure 5:
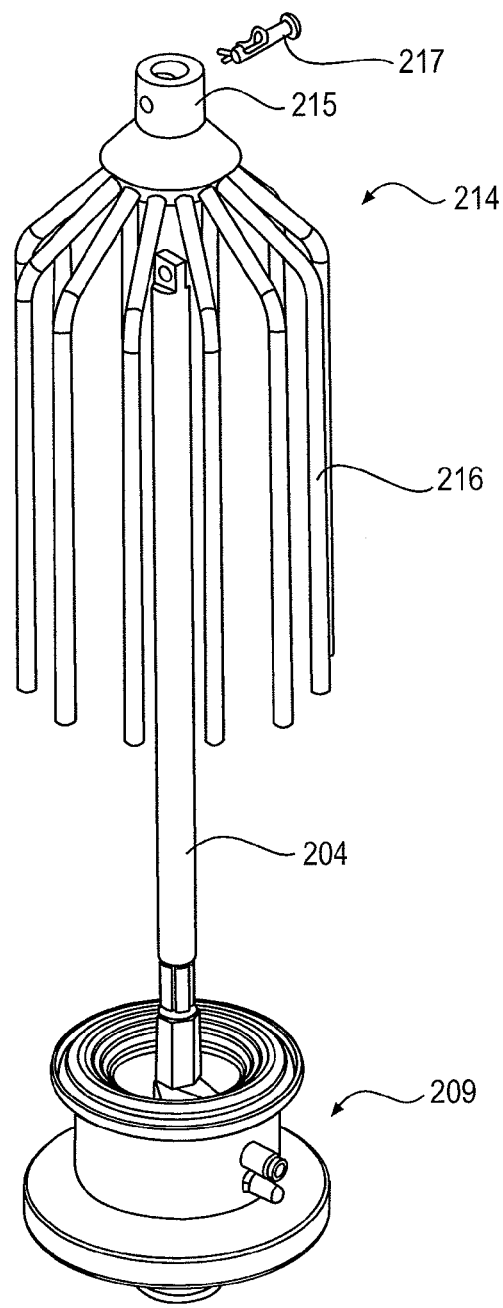
FIG. 5 shows a bottom adapter module or unit and the tree-like structure used in the embodiment of FIG. 4.

FIG. 3 shows another embodiment of a hopper assembly. However, in this embodiment, the hopper assembly H is coupled with a metering device MD used in popular Single-10/Twin-10 feeders. The hopper assembly H utilizes many of the same components as that of FIG. 1 (with certain corresponding common reference numbers), except that hopper 101 is covered by a cover 102 which body 102a has a centrally located sealed insert 103 held in place by a nut 114. A handle 102b of the cover 102 is shifted more to the side to allow space for a vibrator as will shortly be described. The insert 103 is tubular in construction and allows for the passage of a round or generally cylindrical tie member 104. Tie member 104 can be made as a one-piece member, or assembled from several parts connected one another via a joint or connection J. The outside diameter of tie member 104 is slightly less than the inside diameter of the opening in the insert 103, and also includes at least one groove 105 containing a flexible O-ring 106 that provides a radial seal between tie member 104 and insert 103. The upper or protruding end 107 of tie member 104 is coupled by quick connect member 108 with vibrator 109. In contrast to the previous embodiment, the vibrator 109 is located outside the hopper 101. The opposite end 110 of tie member 104 is coupled, via a bracket 19, to the upper part 18 of the insert 14 of lower or adapter module 9 of the type described in FIG. 1. Unlike the previous embodiment, the hopper 101 is coupled to the lower module 9 without utilizing the upper module 10. To load feedstock powder into the hopper 101, the quick connect 108 is disconnected, and vibrator 109 is removed or uncoupled from tie member 104. The cover 102 is then turned to an unlocked position and pulled off. After the hopper 101 is filled with feedstock powder, the cover 102 is replaced and locked by turning it into locking position. The quick connect 108 is then reconnected and the vibrator 109 returns to its working position. When vibrator 109 is activated or turned on, this causes a reciprocating motion of tie member 104 which translates into vertically oriented vibrations of insert 14 of adapter module 9. This causes the feedstock powder to loosen-up and flow through a bottom throat 33 of insert 14 into groove 111 of a moving disk 112 of the device MD. A suction port 113 transfers powder into a conveying line for subsequent use by a thermo spray device (not shown).

FIGS. 4-7 show another embodiment of a hopper assembly H mounted to a metering device MD having the form of a rotary disk feeder. This embodiment utilizes a hopper 201 similar to that of FIG. 1 and an adapter module 209 with a vibrator mounted therein, as will be described in more detail below. The vibrator is driven by compressed air and is coupled to a rigid tie rod 204 having a tree-like structure 214. The structure 214 includes a mounting collar 215 and plural rods or fingers 216 configured to be submerged into bulk feedstock powder contained in hopper 201. A connecting pin 217 can be used to secure the structure 214 to the member 204. The member or tie rod 204 extends upward from the module 209 and supports the tree-like structure 214 of fingers 216. Although other finger configurations can be utilized, in FIG. 5 the fingers 216 are arranged in a circular manner around the central hub 215 and their number and shape may vary. Hub 215 has a bore that slides over upper end of tie rod 204. The connecting or clevis pin 217 fits through cross holes in the rod 204 and collar 215 and holds structure 214 securely on tie rod 204. With such an arrangement, the structure 214 can be restricted as to its axial movement with respect to rod 204. This arrangement may also allow, e.g., partial rotational freedom of movement around a rod axis. In one non-limiting embodiment, an overall diameter of the structure 214 is less than an inside diameter of a hopper fill-up throat. In this way, the structure 214 can be inserted into the hopper 201 by removing the cover 202.

Figure 6:
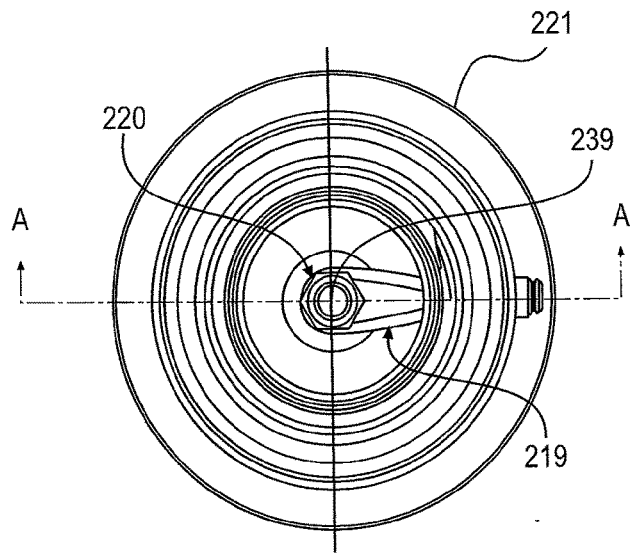
FIG. 6 show a top view of the bottom adapter module used in FIGS. 4 and 5.
Figure 7:
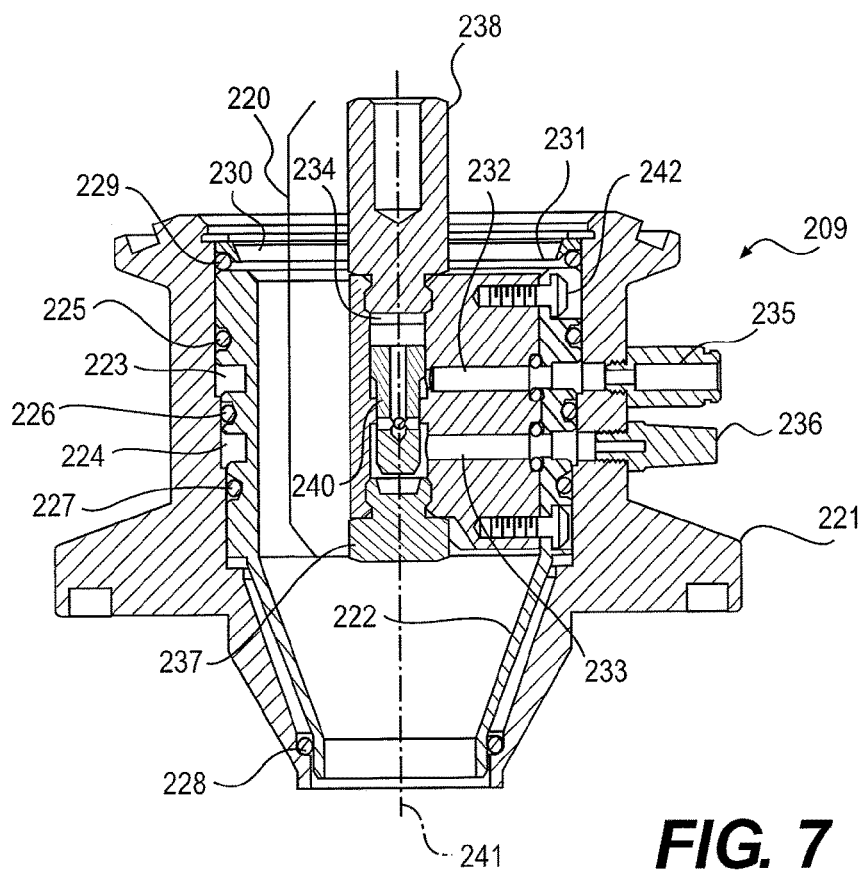
FIG. 7 shows a side cross-section and slightly enlarged view of the bottom adapter module shown in FIG. 6.

FIGS. 6 and 7 show details of the adapter module 209. The module 209 includes a vibrational actuator 220 with connecting body 219. An adapter body 221 has mounted therein an insert 222 with outer grooves 223 and 224 separated from each other, and from interior of the adapter body 221 by flexible O-rings 225, 226 and 227. Another O-ring 228 functions to isolate and maintain a space between insert 222 and adapter body 221 at a bottom location, while another O-ring 229 is retained by a ring 230 and a snap ring 231 prevents powder from entering from above a space between the insert 222 and body 221. The actuator or vibrator 220 is connected with an intake air passage 232 and outlet or exhaust passage 233 that are in fluid communication with a piston bore 234 of the actuator 220. These passages 232 and 234 are also respectively in fluid communication with outer grooves 223 and 224. An intake fitting 235 can be connected to a source of compressed air so as to supply the air to the bore 234. Spent or exhaust air is exhausted by a muffler 236 to the atmosphere. A bottom of piston bore 234 is closed off by plug 237, while top of bore 234 is enclosed by stand-off adapter 238 that has a threaded opening 239 for mounting to a lower end of the tie rod 204. The reciprocating piston 240 is located by bore 234 and can move axially up and down along a vertical axis 241 of module 209. The body 219 is coupled to the insert 222 via screws 242. In operation, the vibrator 220 creates vibrations which are caused by reciprocating piston 240 and these are transferred to the insert 222, which and also, via the adapter 238, to the tie rod 204 and tree-like structure 214. This has the effect of loosening the feedstock powder at both a bottleneck bottom section (immediately above and within the insert 222) of the hopper 201 as well as in the main storing section of the hopper 201.

FIGS. 8-13 show another embodiment of a hopper assembly H. This embodiment can be used with a fluidic type of loss weight feeder such as the one disclosed in U.S. Pat. No. 4,900,199, the disclosure of which is herein incorporated by reference in its entirety. As with some previously disclosed embodiments, the hopper 301 has a removable cover 302 to allow filling with bulk powder. Although not shown, a fitting similar to fitting 11 in FIG. 1 can be mounted to the hopper 301 in order to supply fluidizing gas to a powder free top hopper zone. A vertically oriented tubular member or rod 304 can receive and collect fluidizing gas from the upper zone of the hopper and transfer it through the powder bulk to a fluidizing zone 303 proximate to a pick-up device 330. The bottom of member 304 is coupled to a porous stone member 305 that distributes gas around the pick-up device 330. Radial bent wire-forms or supports 312 are configured to retain the member 304 in a centered position relative to an upper portion of the hopper 301. The bottom portion of the member 304 rests in a socket 306 and can be slid into the same from above as is evident from FIGS. 8A, 8B and 9. A vertical cross hole is formed through a horizontal tie rod 307 and the tie rod 307 is mounted so as to pass through a side wall. The tie rod 307 is supported through the side wall by flexible O-rings relative to a mounting sleeve 308. The outside portion of a tie rod 307 is coupled to a bracket 310 to which an external vibrator 320 is mounted. A lower part of tubular member 304 passes through a sizing screen 321 and a flexible peripheral annular ring 322 prevents bulk powder from leaking past or outside of the sizing screen 321. The screen 321 can be flat or disc-shaped or of conical or cup-like shape, i.e., with elevated sides to allow easy removal of accumulated debris from the hopper 301.

The structure arranged in the hopper 301 includes a number of main components such as the upper centering supports 312, the support tube 304, an inlet 335, a lower centering support that includes a dome-structure 332 with support tabs 331 that surround the porous stone 305. The tabs could be solid or perforated, and their number may vary. The dome 332 is mounted under screen structure 321 with a space sufficient for powder flow and move around and into a fluidizing zone 303. The lower-middle part of tubular member 304 has mounted thereto star-like elements 333 and 334. An upper star-like element 336 can also be mounted to an more upper portion the tube 304. These star-like elements can preferably have radially oriented spokes which are staggered relatively to one another. The number of spokes of each star can vary as well as the number of star elements. When hopper is empty, whole structure can be sized to allow for manual installation and removal upon removing the cover 302. In operation, oscillations from vibrator 320 transfer via tie rod 307 and socket 306 to the structure within the hopper 301 and into the bulk powder. Simultaneously, screen structure 321 acts as a vibro-screen with a relatively small active area, which ensures that undersized powder particles move through screen 321, while keeping out oversized specks or preventing the same from reaching the fluidizing zone 303. Tabs 331 and elements 333, 334 and 336 also vibrate. The vibrations further assist powder fluidization proximate to a pick-up device 330.

Figure 8:
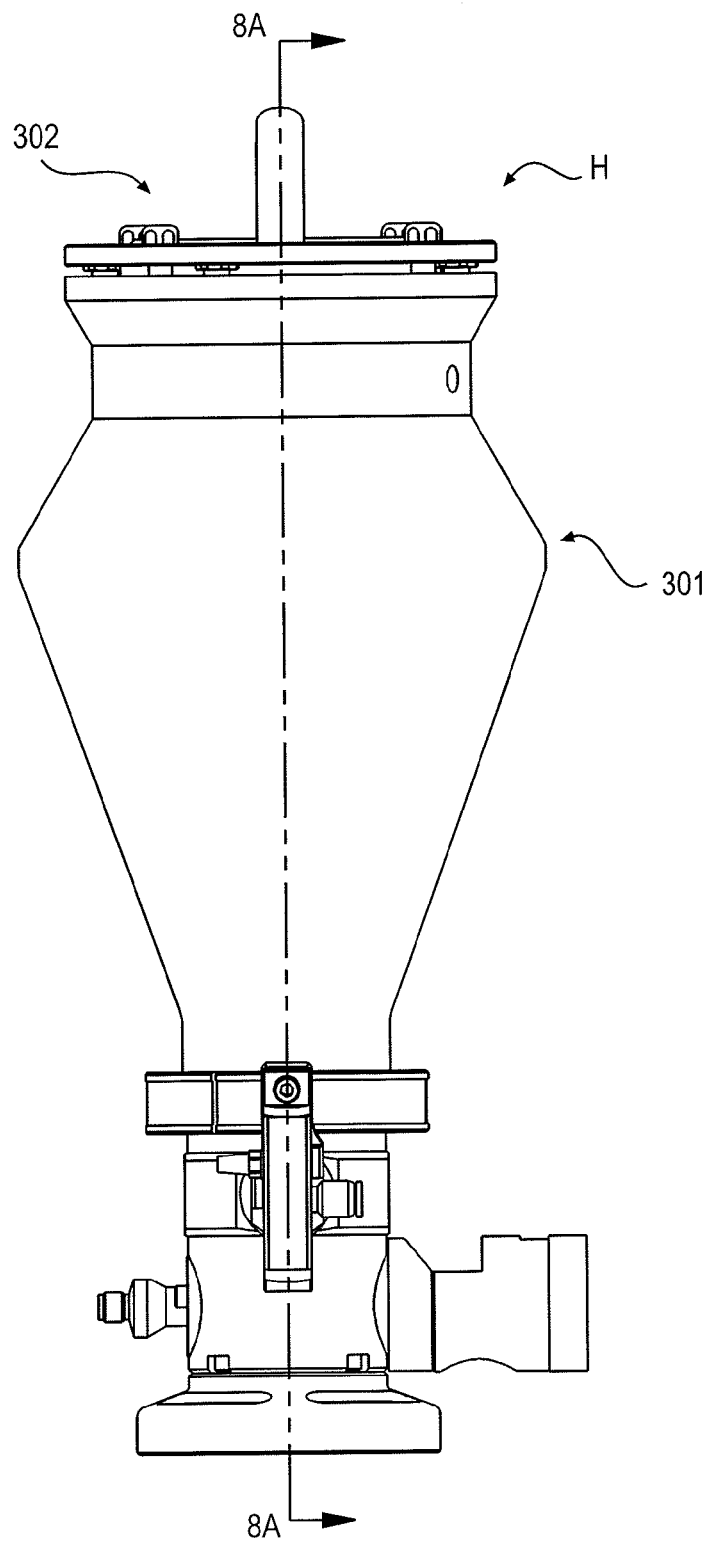
FIG. 8 shows a fourth non-limiting embodiment of a hopper assembly in accordance with the invention. In this embodiment, a rocking lever type external vibrational actuator is used in combination with a spoke-like structure that propagates vibrations into bulk powder. This embodiment is configured for installation onto a fluidic type of "lost weight feeder"
Figures 8A, 8B:
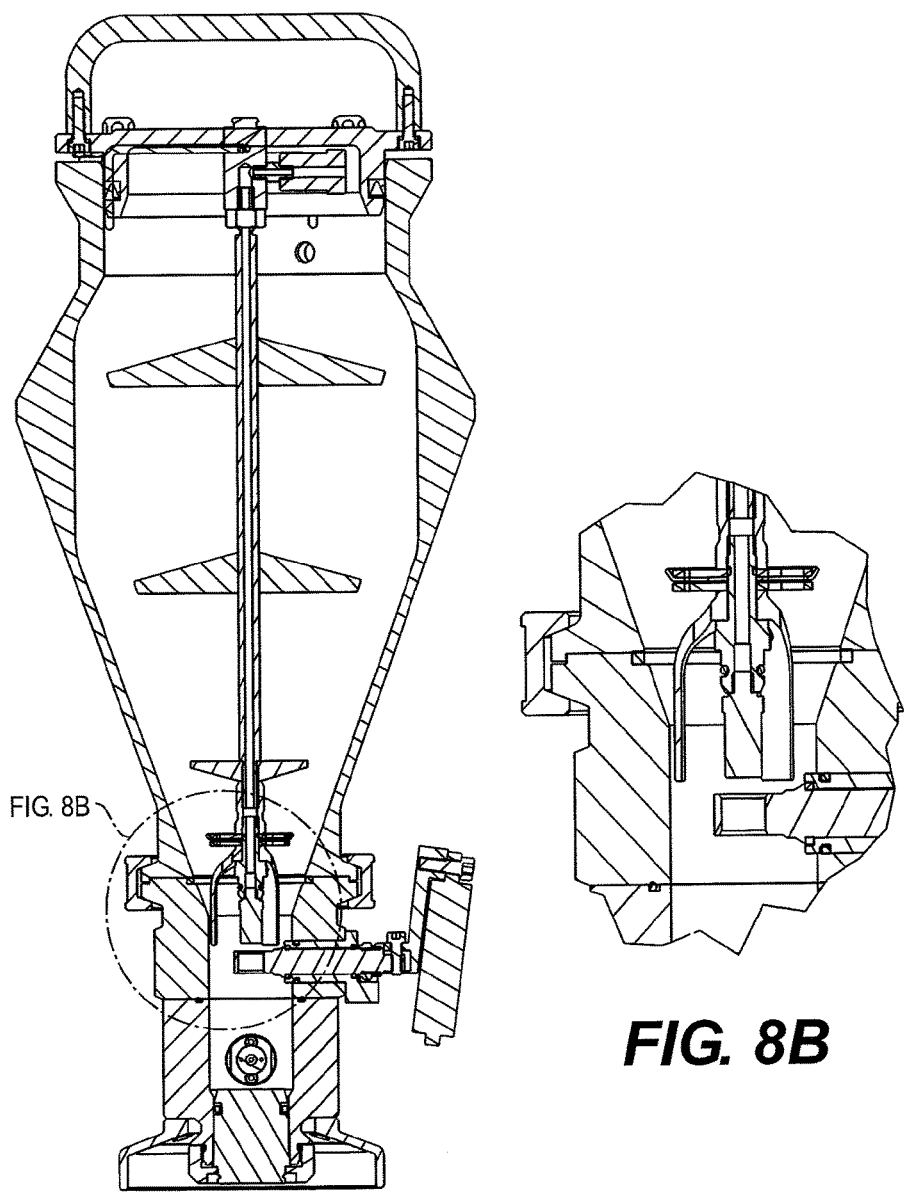
FIG. 8A shows a cross-section view of FIG. 8 rotated 90 degrees and with the spoke-like structure not yet installed on or slid into the vibration causing unit or assembly.
FIG. 8B shows an enlarged portion of FIG. 8A.
Figure 9:
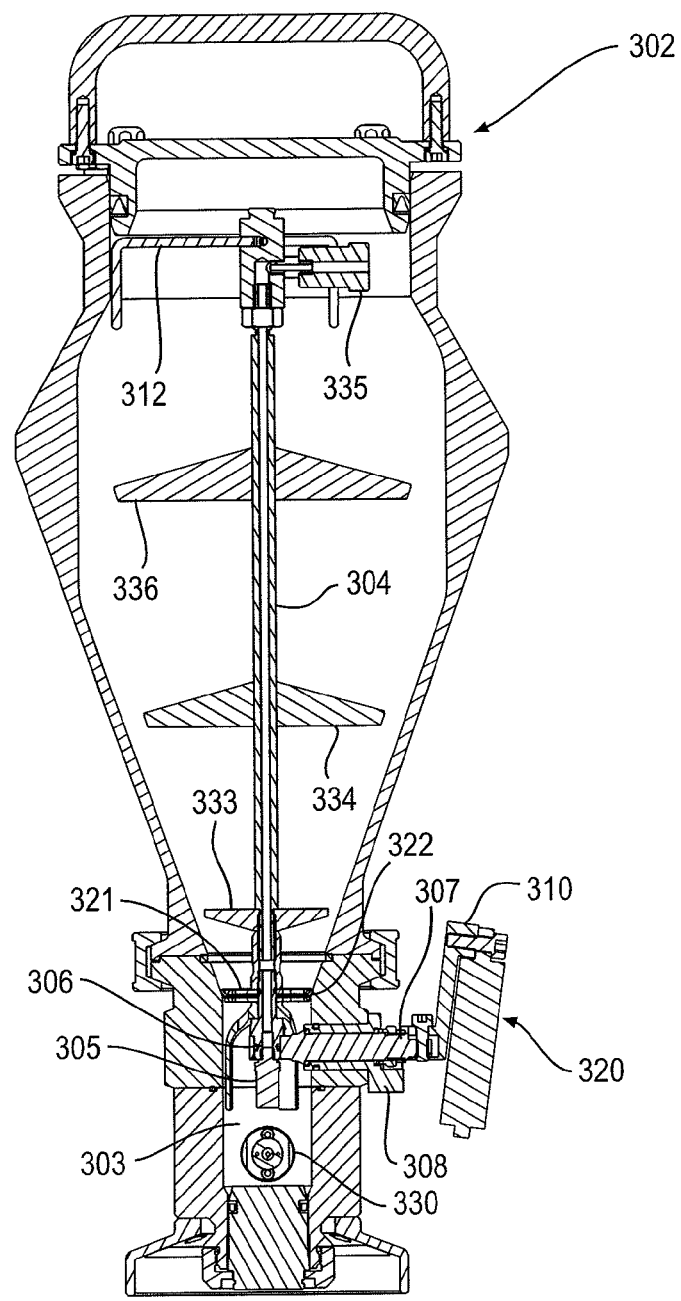
FIG. 9 shows a cross-section view of FIG. 8 rotated 90 degrees and with the spoke-like structure installed or slid into the vibration causing unit or assembly.
Figure 9A:
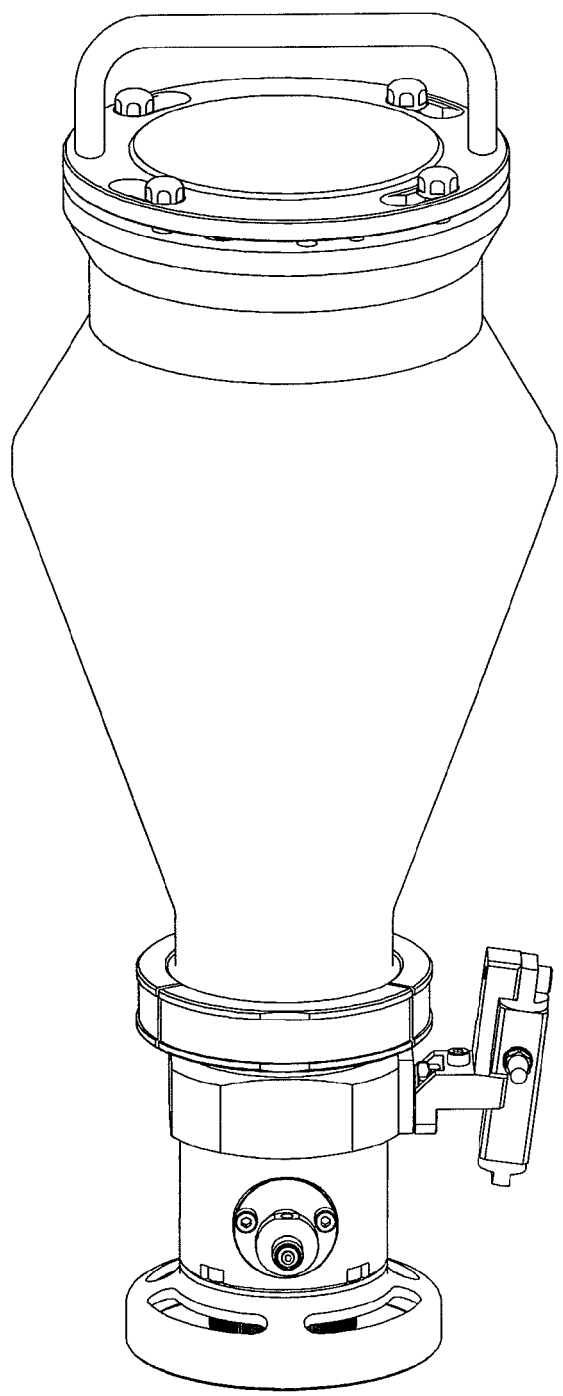
FIG. 9A shows a side view of FIG. 8 rotated 90 degrees.
Figure 10:
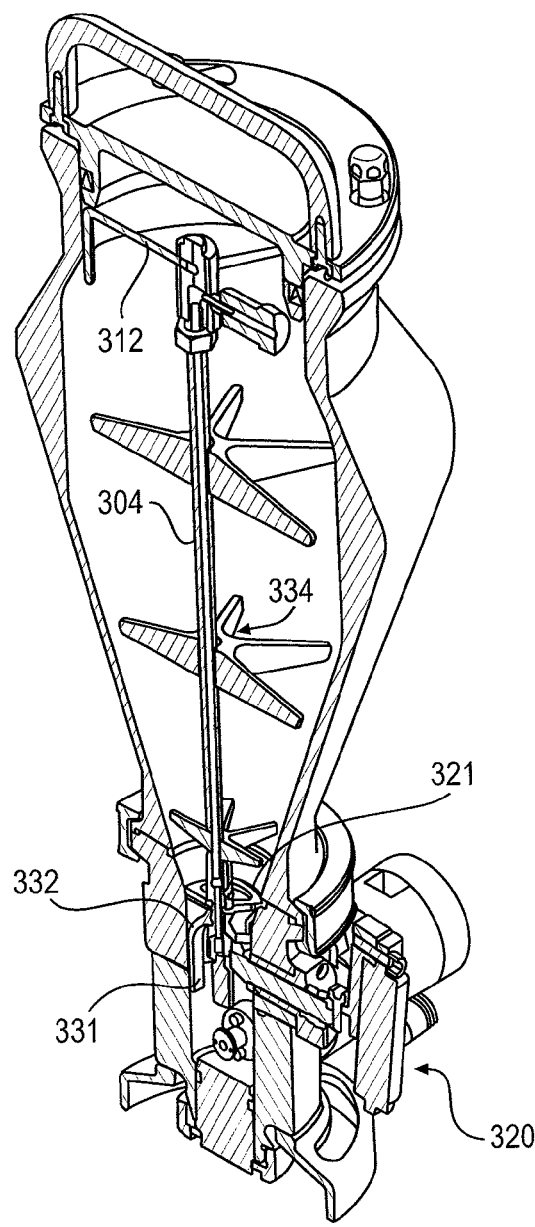
FIG. 10 shows a perspective cross-section view of FIG. 8.

FIGS. 14-16 show an alternative skeleton or internal structure which can be utilized in the hopper shown in FIGS. 8-10. The structure can include comparable elements such as the tube 304 so as to be fully interchangeable with structure shown in FIGS. 9-13. However, the screen structure 321 is replaced with a screen structure 350 having a funnel section 351 in such a way as to form a screen cup whose bottom functions as a screen. The upper part 352 of a funnel 351 is open toward the hopper interior and utilizes a flexible annular ring 353. When placed into the hopper 301, the ring 353 provides a flexible seal between funnel 351 and a hopper inner wall. This arrangement separates fluidizing zone from the bulk feedstock powder by a screen while at the same time transferring vibrations to the bulk powder disposed within the hopper. The use of structure 350 can provide a higher level of contamination protection for certain powders. Of course, one or more star-like elements of the type previously described, e.g., elements 333, 334 and 336 as described above, can be mounted to the tube 304 to enhance the loosening action of vibration.

Figure 19:
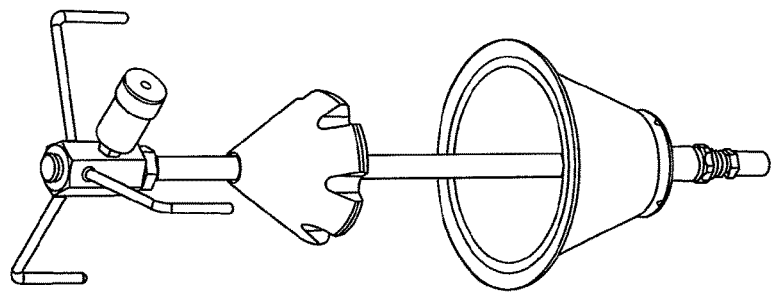
FIG. 19 shows a side perspective view of the alternative spoke-like structure of FIG. 17.
Figure 18:
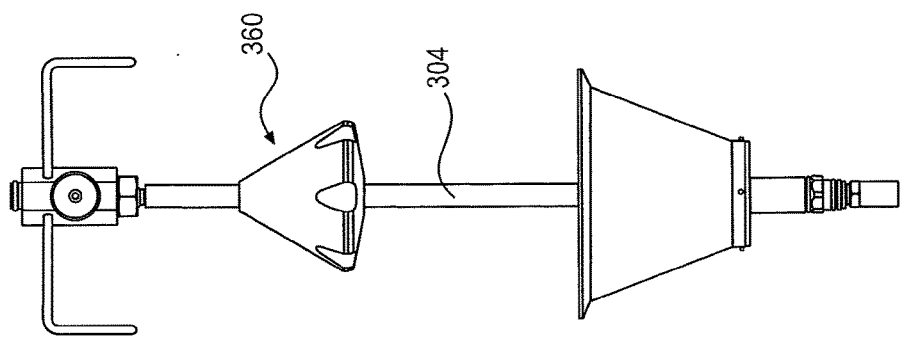
FIG. 18 shows another side view of the alternative spoke-like structure of FIG. 17.
Figure 17:
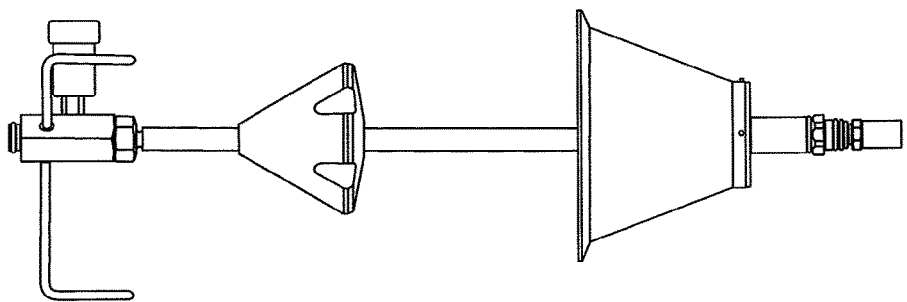
FIG. 17 shows a side view of another alternative spoke-like structure that can be used in the embodiment of FIG. 8.

FIGS. 17-19 show an alternative skeleton or internal structure which can be utilized in the hopper shown in FIGS. 8-10. The structure can include comparable elements such as the tube 304. In addition, a cone-shaped member 360 is mounted thereto and functions to prevent ratholing of bulk powder and to assist the formation of powder mass flow.

Referring now to another embodiment shown in FIGS. 20-36, wherein there is shown a hopper assembly H which utilizes a hopper 401 and a hermetically sealed cover 402 removably mounted to the hopper 401. As in previous embodiments, the cover 402 includes a base and a handle and can be releasably locked to the hopper 401 via a connection arrangement. With such an arrangement, the cover 402 can be lowered axially and then twisted or partially rotated into locking position.

The embodiment of FIG. 20 can be used with a fluidic type of loss weight feeder such as the one disclosed in U.S. Pat. No. 4,900,199, the disclosure of which is herein incorporated by reference in its entirety. As with previously embodiments, the hopper 401 has a removable cover 402 to allow filling with bulk powder. As seen in FIG. 20, a fitting similar to fitting 11 in FIG. 1 is mounted to the hopper 401 in order to supply fluidizing gas to a powder free top hopper zone. As shown in FIG. 22, a vertically oriented tubular member or rod 404 can receive and collect fluidizing gas from the upper zone of the hopper and transfer it through the powder bulk to a fluidizing zone 403 proximate to a pick-up device 430. The bottom of member 404 is coupled to a porous stone member 405 that distributes gas around the pick-up device 430. Radial bent wire-forms or supports 412 are configured to retain the member 404 in a centered position relative to an upper portion of the hopper 401. The bottom portion of the member 404 rests in a socket 406 and can be slid into the same from above (similar to the way shown in FIGS. 8A, 8B and 9). A vertical cross hole is formed through a horizontal tie rod 407 and the tie rod 407 is mounted so as to pass through a side wall. The tie rod 407 is supported through the side wall by flexible O-rings relative to a mounting sleeve 408. The outside portion of a tie rod 407 is coupled to an externally mounted vibrator 420. As is evident from FIG. 23, a lower part of tubular member 404 is connected to a funnel section assembly whose main components are a funnel section 451 and a connector 460. As can be seen in FIGS. 30 and 31, the connector 460 has spokes that define through openings 465 (see 32-34) that allow powder to exit from the bottom end of the funnel section 451. In an alternative embodiment illustrated in FIGS. 27-29, a screen 480 which is flat or disc-shaped is arranged above the openings 465 and is axially retained be the connector 460 and funnel section 451.

Referring back to FIGS. 22 and 23, one can see that the funnel section 451 has a conical shape and/or is a conical member with a larger size or diameter upper end 452 and a smaller size or diameter lower end 454. A sealing ring 453 is located in an area of the upper end and functions to dynamically seal or prevent powder material inside the hopper from passing outside of the funnel section 451.

Referring now to FIGS. 32-36, one can see details of the connector 460 which connects the funnel section 451 to the member 404. The connector has a larger size or diameter upper section 463 and a smaller size or diameter lower section 461. Spokes 464 connect these sections and define openings 465 as described above. A lower opening 462 functions to couple the connector 460 to internal components of the vibrator 420 (see FIGS. 22 and 23). An upper opening 467 functions to couple the connector 460 to the member 404 (see FIGS. 22 and 23). An upper surface 466 can function to support an optional screen 480 (see FIGS. 27 and 29).

As with previous embodiment, when the hopper shown in FIG. 20 is empty, the whole structure shown in FIG. 24 can be sized to allow for manual installation and removal upon removing the cover 402. In operation, oscillations from vibrator 420 transfer via tie rod 407 and socket 406 to the structure shown in FIG. 24 located within the hopper 401, and, via the structure, into the bulk powder. The vibrating funnel section 451, in particular, functions to efficiently move powder particles down and through the openings 465 and into the fluidizing zone 403.

In each of the herein disclosed embodiments, the vibrator can provide exemplary vibrations in the range of approximately 2000 to approximately 20000 vibrations per minute.

In addition, acceptable, preferred and most preferred non-limiting volumes for the hoppers include 2 L (liters), 3.5 L, 4 L and 5 L. In addition, non-limiting materials for the hopper and structures used therein include aluminum and stainless steel coated with wear resistant and/or anti-friction coatings.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A vibrator assembly for a hopper, comprising:
   a generally conical member adapted to be mounted within a hopper;
   at least one upper sealing surface arranged at an upper portion of the generally conical member and being sized and configured to sealing engage with an inside surface of the hopper; and
   at least one connecting portion connecting a lower portion of the generally conical member to a vibration device and defining a flow passage,
   wherein the at least one connecting portion comprises plural connecting portions that define plural flow passages.

2. The assembly of claim 1, wherein the generally conical member is mountable within a lower conical portion of the hopper.

3. The assembly of claim 1, wherein the generally conical member has a center axis oriented generally vertically.

4. The assembly of claim 1, wherein the at least one sealing surface is arranged on an annular member.

5. The assembly of claim 4, wherein the annular member is mounted to the upper portion of the generally conical member.

6. The assembly of claim 1, wherein the at least one connecting portion comprises a web portion of an annular connecting member.

7. The assembly of claim 6, wherein the annular connecting member comprises an upper circular flange portion and a lower shaft portion and the web comprises plural radially oriented webs.

8. The assembly of claim 1, wherein the vibration device comprises a vibrator.

9. The assembly of claim 8, wherein the vibrator is a pneumatic or electric actuator mounted to housing located beneath the hopper.

10. The assembly of claim 8, wherein the vibration device further comprises an elongate member that extends through the generally conical member.

11. The assembly of claim 1, wherein the hopper is a feedstock material hopper containing a thermal spray powder.

12. The assembly of claim 1, wherein the hopper is coupled to a feeder device.

13. The assembly of claim 12, wherein the feeder device is one of a rotary disk feeder and a lost weight feeder.

14. The assembly of claim 1, wherein the vibration device is an actuator generating vibrations in a range of about 2000 to about 20000 vibrations per minute.

15. The assembly of claim 1, wherein the vibration device is arranged in an area of a hopper discharge opening.

16. The assembly of claim 1, wherein the vibration device is arranged inside the hopper.

17. The assembly of claim 1, wherein the vibration device is coupled to a vibrator arranged outside the hopper.

18. The assembly of claim 1, wherein the vibration device comprises a tubular member having radially oriented spokes.

19. The assembly of claim 1, further comprising a least one screen located in an area of the lower portion of the generally conical member.

20. A vibrator assembly for a hopper, comprising:
   a generally conical sleeve adapted to be mounted within a hopper and defining an internal conical space;
   an annular seal arranged at an upper annular portion of the generally conical sleeve; and
   a connecting portion connecting a lower annular portion of the generally conical sleeve to a vibration member;
   plural flow passages and a web portion arranged in an area of the lower annular portion,
   wherein vibrations of the vibration member transfer to the generally conical sleeve via the connecting portion and the at least one flow passage allows material inside the generally conical sleeve to pass there-through and out the lower annular portion.

21. A vibrator assembly for a hopper, comprising:
   a generally conical sleeve adapted to be mounted within a hopper with an axis of the generally conical sleeve being axially aligned with an axis of the hopper;
   an annular seal arranged at an upper annular portion of the generally conical sleeve; and
   a connecting portion connecting a lower annular portion of the generally conical sleeve to a vibration member and defining flow passages,
   wherein vibrations of the vibration member transfer to the generally conical sleeve via the connecting portion, and the flow passages allow material inside the generally conical sleeve to pass there-through,
   wherein the flow passages are separated by a web portion.

22. A hopper assembly for powder feedstock, comprising:
   a hopper configured to contain a feedstock material and having a bottom discharge section;
   a vibrator assembly of claim 1; and
   a vibration source.

23. A pressurizable and/or hermetically sealable hopper assembly for thermal spray powder feedstock, comprising:
   a hopper configured to contain a feedstock material and having a tapered bottom section;
   a vibrator assembly of claim 1; and
   a vibration source coupled to the vibrator assembly.

24. A method of feeding powder feedstock material to a feeder device via the hopper assembly of claim 22, the method comprising:
   actuating the vibration source to impart vibration to the powder feedstock material disposed inside the hopper.

* * * * *